(12) United States Patent
Pillai et al.

(10) Patent No.: US 9,021,439 B2
(45) Date of Patent: Apr. 28, 2015

(54) GREEN SOFTWARE APPLICATIONS

(71) Applicant: CenturyLink Intellectual Property LLC, Denver, CO (US)

(72) Inventors: Vishak Shanmugam Pillai, Bangalore (IN); Darshan Sonbarse, Bangalore (IN); Viswanath Seetharam, Bangalore (IN); Manoj U P, Bangalore (IN)

(73) Assignee: CenturyLink Intellectual Property LLC, Denver, CO (US)

(*) Notice: Subject to any disclaimer, the term of this patent is extended or adjusted under 35 U.S.C. 154(b) by 45 days.

(21) Appl. No.: 13/937,379

(22) Filed: Jul. 9, 2013

(65) Prior Publication Data
US 2014/0325481 A1 Oct. 30, 2014

Related U.S. Application Data

(60) Provisional application No. 61/815,940, filed on Apr. 25, 2013.

(51) Int. Cl.
G06F 9/44 (2006.01)
G06F 11/34 (2006.01)

(52) U.S. Cl.
CPC ................... *G06F 11/3409* (2013.01)

(58) Field of Classification Search
CPC ............ G06F 11/3688; G06F 11/3664; G06F 11/3684; G06F 11/3466; G06F 2201/865
USPC .................................................. 717/124, 131
See application file for complete search history.

(56) References Cited

U.S. PATENT DOCUMENTS

2012/0078404 A1* 3/2012 Saito et al. ...................... 700/97
2013/0223545 A1* 8/2013 Zhang et al. .................. 375/259

OTHER PUBLICATIONS

Software Power Estimation and Optimization 1999, available website: http://www.eecs.berkeley.edu/newton/Classes/EE290sp99/lectures/ee290aSp9912_2/ucb-sw-lecture-99.PDF, 23 pages; accessed on Jun. 28, 2013.
Network Energy Efficiency Cisco Review and Results 2008, available website: http://www.cisco.com/en/US/prod/collateral/modules/ps2706/ps6526/brochure_CO2-502519.pdf, 6 pages; accessed on Jun. 28, 2013.

(Continued)

*Primary Examiner* — Anna Deng
(74) *Attorney, Agent, or Firm* — Swanson & Bratschun, L.L.C.

(57) ABSTRACT

Novel tools and techniques are provided for implementing green software applications and/or certifying software applications with a green applications efficiency ("GAE") rating. Implementing green software applications might include performing performance tests of a software application, measuring power consumption of one or more hardware components, in response to execution of the software application during the one or more performance tests, generating a power consumption profile for the software application based on the measure power consumption, and tuning the software application such that power consumption of the one or more hardware components matches a power load caused by execution of the software application, based at least in part on the power consumption profile for the software application. Certifying software applications might include calculating an efficiency rating based on measured or calculated hardware power consumption, calculating the GAE rating for the software application, and certifying the software application with the GAE rating.

10 Claims, 11 Drawing Sheets

(56) References Cited

OTHER PUBLICATIONS

IBM Tivoli Monitor, 2013, available website: http://publib.boulder.ibm.com/infocenter/tivihelp/v15r1/index.jsp?toc./com.ibm.itm.doc/toc.xml, 1 page accessed on Jun. 28, 2013.

Prelytis, 2013, available website: http://www.prelytis.com/en/livedashboard/, 4 pages, accessed on Jun. 28, 2013.

Chan et al, 2007, IBM T.J. Watson Research Center, Green Applications: software applications that optimize energy, pp. 842-843.

* cited by examiner

| Legend | |
|---|---|
| 305 | JSO |
| 310 | Power Consumption |

GREEN SOFTWARE APPLICATIONS

CROSS-REFERENCES TO RELATED APPLICATIONS

This application claims priority to U.S. Patent Application Ser. No. 61/815,940 (the "'940 application"), filed Apr. 25, 2013 by Vishak Shanmugam Pillai, et al., entitled, "Green Software Applications," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, apparatus, and computer software for certifying and/or implementing green software applications.

BACKGROUND

Software applications ranging from hand-held device-based, desktop-based, and Enterprise-based software applications have evolved in complexity. As the complexity of software increases, so does the demand for more powerful hardware components. As a result, energy consumption has gone to very high levels. For example, Enterprise applications typically comprise different interdependent and complex software applications deployed over multiple servers. In most cases, services might be published and consumed across enterprises. Consequently, energy consumption due to execution of Enterprise applications has increased to very large scale. As a result of this increase in energy consumption, organizations are spending huge amounts of money on energy costs and software applications leave a big carbon foot print. Determining discrete energy consumption of an individual application has become a big challenge and, consequently, optimizing an application to reduce its energy consumption has become an equally big challenge as well.

In the case of hand held devices, laptop computers, and tablet computers, or the like, applications, if not properly designed or tuned to conserve energy, will tend to drain the battery quickly. Thick Client applications, standalone desktop applications, and applications, which can be installed in hand held devices, personal computers, or the like, can also cause excessive power consumption if not properly tuned or designed. Hardware components are the primary energy consumers, but the energy consumption is driven by the software application(s) using these components.

Leading energy management applications in the industry include, for example, applications developed by Intel Corp. based on research on Software Power Estimation and Optimization, applications developed by Cisco as documented by Cisco's Review and Results of Network Energy Efficiency, IBM's Tivoli Monitor, PRELYTIS, and applications based on IMB's research on Green Applications: software applications that optimize energy usage. Most of these conventional solutions focus on hardware level energy monitoring, operating system tweaking, or the like to optimize energy consumption. These solutions, however, do not address the following areas to reduce carbon footprint by a single software application: (1) Software application level energy profiling across a designed work load across various phases; (2) Identification of intensive energy consumption areas by software application due to specific hardware utilization (like RAM, CPU, Hard disk, etc.); (3) Creating an Energy Consumption Model by the software application; (4) Developing a method to determine software application efficiency across different load conditions and rating method; and/or (5) Application Tuning, Capacity Planning, accurate hardware matching, etc., from the software application perspective; or the like.

The embodiments disclosed herein are directed toward overcoming one or more of the problems discussed above.

BRIEF SUMMARY

Various embodiments provide techniques for implementing green software applications and/or certifying software applications with a green applications efficiency ("GAE") rating.

In some instances, to implement green software applications, performance measurements of the software application under evaluation must first be obtained. After all, what can't be measured can't be controlled. This might include measuring power consumption of hardware components, such as, but not limited to, the central processing unit ("CPU"), the hard disk, the memory (e.g., Random Access Memory ("RAM")), the network device, the graphics processors, or the like. A power consumption profile for the software application, based on the measured power consumption, can then be generated, and based on this profile, the software application can be tuned to achieve improved power efficiency, or a match between the computation output or load imposed on the software application and the power consumption of the hardware components as a result of execution of the software application.

Implementing green software applications, in various embodiments, might include categorizing the software application based in part or in whole on measured or calculated power consumption of the hardware components. The GAE rating for the software application can be calculated as a result. Based on the category, the subject software application may be further evaluated using a root cause analysis to determine underlying causes of the power inefficiencies. With the results from the root cause analysis, solution approaches may be determined to minimize or eliminate the power inefficiency in the software application. A user can then be provided with a summary of the problem associated with the evaluated software application, along with solution approaches that the user can take to tune the software application to achieve improved GAE Rating (or power efficiency). GAE Rating for a software application may be provided with the hardware details and operating platform details against which the certification was done.

To determine whether or not to implement the processes discussed above for achieving green software applications, one must first determine what the power efficiencies are for the subject software applications. To that end, various techniques are provided for certifying software applications with a GAE rating, which may be used to label software applications according to levels of power efficiency. For the certification process, effective power consumption and effective computational work performed by the hardware components might first be calculated for each load phase in the operational cycle of the software application. These load phases might be part of the pre-designed workload model which may be based on historical real time load conditions or as specified by the end user of the software application. Based on these calculated values, the efficiency rating for the software application for each load phase may be calculated, and the software application can, in some instances, be categorized into appropriate efficiency categories.

An overall GAE rating might be calculated for the evaluated software application based on the efficiency categories in which it has been categorized and/or based on its calculated efficiency rating. The software application can then be certified with the calculated GAE rating, which might be in the form of a percentage efficiency value, a quadrant designation (e.g., a color designation, an alphanumeric designation, a numeric designation, an alphabetical designation, or the like), an appropriate efficiency notation, or a combination thereof. Certification might be based on the operating environment, which might comprise the operating system and hardware, hosting the subject software application.

Cost Savings by reducing energy consumption can be achieved if one or more of the following approaches are implemented: (1) Accurately measuring discrete energy consumption by individual application and carbon footprint across different phases of application work load and efficiency calculation; (2) Identifying areas of high energy consumption due to excessive hardware component utilization (including, without limitation, CPU, RAM, DISK, NETWORK, etc.), and implementing appropriate hardware sizing and cost saving measures. These measures might include, but are not limited to: (a) Tuning of software applications for optimum utilization of resources; (b) Implementing appropriate hardware matching; (c) Utilizing "Homogeneous Application Cultivation" techniques; or the like. By implementing one or more of these approaches, the carbon footprint of a particular software application may be reduced, and thereby enabling Green Software Applications. The idea is to optimize the way hardware utilization is done by software applications.

The tools provided by various embodiments include, without limitation, methods, systems, and/or software products. Merely by way of example, a method might comprise one or more procedures, any or all of which might be executed by a computer system. Correspondingly, an embodiment might provide a computer system configured with instructions to perform one or more procedures in accordance with methods provided by various other embodiments. Similarly, a computer program might comprise a set of instructions that are executable by a computer system, or by a processor located in the computer system, to perform such operations. In many cases, such software programs are encoded on physical, tangible, and/or non-transitory computer readable media. Such computer readable media might include, to name but a few examples, optical media, magnetic media, and the like.

In an aspect, a method might be provided for certifying software applications with a green applications efficiency ("GAE") rating. The method might comprise calculating, with a computer, effective power consumption and effective computational work performed by one or more hardware components, in each load phase of a plurality of load phases, in response to execution of a software application, as measured by one or more measurement tools in communication with the computer. This certification might be performed for a particular operating platform which might comprise at least one of the one or more hardware components and an operating system, both of which might be used to host the subject application. The plurality of load phases might comprise an initiation phase, a low load phase, an efficient load phase, a maximum load phase, an idle load phase, and a pre-stop/stop phase. The method might further comprise calculating, with the computer, an efficiency rating for the software application, for each load phase, based on the calculated effective power consumption and the calculated effective computational work performed for the software application, for each load phase, and categorizing, with the computer, the software application into one of four efficiency quadrants, based on computational output (or load) and power consumption of the software application, and based on the calculated efficiency rating for the software application. The efficiency quadrants might comprise a high output-low power quadrant, a high output-high power quadrant, a low output-low power quadrant, and a low output-high power quadrant The method might further comprise calculating, with the computer, an overall green applications efficiency ("GAE") rating for the software application, based on the categorizing of the software application into one of the four efficiency quadrants, and based on the calculated efficiency rating for the software application. The method might also comprise certifying, with the computer, the software application with the calculated GAE rating.

In some embodiments, the software application might comprise one of a mobile software application, a tablet computer software application, a standalone desktop software application, an enterprise software application, or a software application deployed in a virtualized environment In some instances, calculating the effective power consumption and the effective computational work performed by one or more hardware components, in each load phase, in response to execution of the software application might comprise calculating a Justified Software Output and Software Energy Efficiency, which might comprise factoring a drag coefficient associated with each hardware component affected during each load phase, calculating an impact cost factor for each drag coefficient, and calculating the Justified Software Output based on the factored drag coefficient associated with each hardware component affected during each load phase and the calculated impact cost factor for each drag coefficient.

In other cases, calculating the effective power consumption and the effective computational work performed by one or more hardware components, in each load phase, in response to execution of the software application might comprise calculating a Computational Work Done and Software Energy Efficiency, which might comprise calculating a computational force applied, a computational throughput, and computational memory utilization, and calculating the Computational Work Done based on the calculated computational force applied, computational throughput, and computational memory utilization over a predetermined period.

In another aspect, a method might be provided for implementing green software applications. The method might comprise monitoring, with a computer, hardware utilization for each of a plurality of hardware, in response to execution of a software application across varying load conditions, as measured by one or more measurement tools in communication with the computer. The plurality of hardware might comprise one or more central processing units ("CPUs"), one or more memory devices, one or more disk input/output ("I/O") devices, one or more network devices, and one or more graphics processors. The method might further comprise categorizing, with the computer, the software application as one of a CPU intensive application, a memory intensive application, a disk I/O intensive application, network intensive application, a graphics intensive application, or a combination of one or more of these categories ("combination intensive application"), based at least in part on results of the monitoring of the hardware load for each of the plurality of hardware, in response to execution of the software application The method might further comprise, based on said categorizing, performing, with the computer, a root cause analysis for inefficiency for the software application, and, based on the root cause analysis, determining, with the computer, one or more solution approaches for minimizing or eliminating inefficiency for the software application. The method might also comprise sending, with the computer, the one or more solution approaches to one or more user devices for displaying, on the one or more user devices, recommendations for minimizing or eliminating inefficiency for the software application. In some instances, the recommendations for minimizing or eliminating inefficiency for the software application might be displayed in conjunction with the operating system and hardware used to host the software application.

In yet another aspect, an apparatus might be provided for certifying software applications with a green applications efficiency ("GAE") rating. The apparatus might comprise a processor and a non-transitory computer readable medium having stored thereon software comprising a set of instructions that, when executed by the processor, causes the apparatus to perform one or more functions. The set of instructions might comprise instructions to calculate effective power consumption and effective computational work performed by one or more hardware components, in each load phase of a plurality of load phases, in response to execution of a software application, as measured by one or more measurement tools in communication with the apparatus. The plurality of load phases might comprise an initiation phase, a low load phase, an efficient load phase, a maximum load phase, an idle load phase, and a pre-stop/stop phase.

The set of instructions might further comprise instructions to calculate an efficiency rating for the software application, for each load phase, based on the calculated effective power consumption and the calculated effective computational work performed for the software application, for each load phase, and instructions to categorize the software application into one of four efficiency quadrants, based on computational output (or load) and power consumption of the software application, and based on the calculated efficiency rating for the software application. The efficiency quadrants might comprise a high output-low power quadrant, a high output-high power quadrant, a low output-low power quadrant, and a low output-high power quadrant.

The set of instructions might further comprise instructions to calculate an overall green applications efficiency ("GAE") rating for the software application, based on the categorizing of the software application into one of the four efficiency quadrants, and based on the calculated efficiency rating for the software application, and instructions to certify the software application with the calculated GAE rating.

In still another aspect, a method might be provided for implementing green software applications. The method might comprise performing, with a computer, one or more performance tests of a software application, evaluating, with the computer, a performance of the software application during the one or more performance tests, and measuring, with the computer, power consumption of one or more hardware components, in response to execution of the software application during the one or more performance tests. The method might further comprise generating, with the computer, a power consumption profile for the software application, based on the measured power consumption. The method might also comprise tuning the software application, such that power consumption of the one or more hardware components matches a power load caused by execution of the software application, based at least in part on the power consumption profile for the software application. In some instances, tuning might be performed automatically by the computer, based at least in part on the power consumption profile for the software application. In other instances, tuning might be performed manually, based at least in part on the power consumption profile for the software application.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
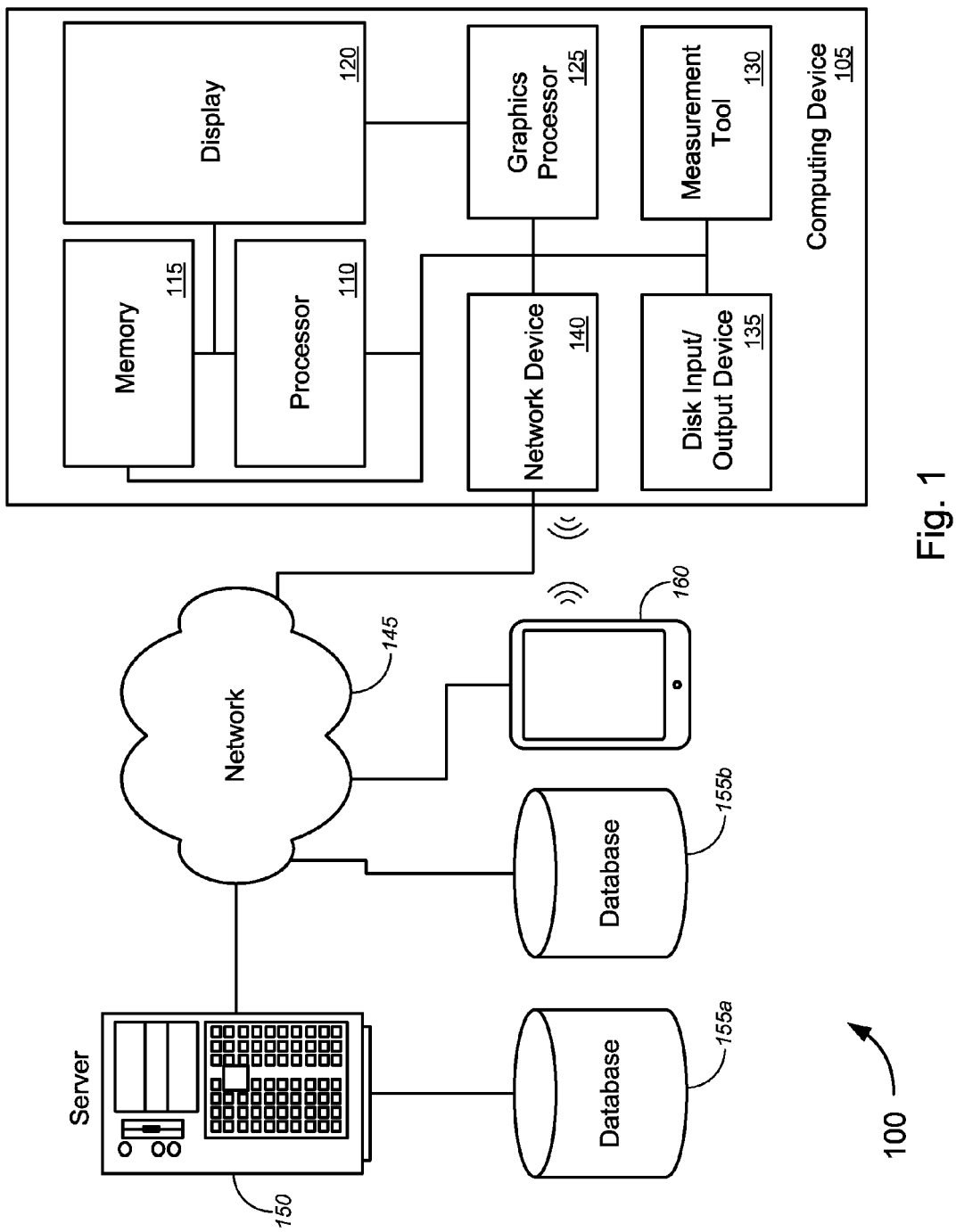
FIG. 1 is a general schematic diagram illustrating an exemplary system for certifying software applications with a green applications efficiency ("GAE") rating or for implementing green software applications, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for implementing green software applications and/or certifying software applications with a green applications efficiency ("GAE") rating with respect to the specific operating environment where the subject application was hosted on. The operating environment, in some cases, might comprise the operating system and the hardware platform.

In some instances, to implement green software applications, performance measurements of the software application under evaluation must first be obtained. After all, what can't be measured can't be controlled. The performance measurements might include an evaluation of the software application and hardware components during various performance tests that might be isolated or performed in an active computational environment together with other software applications. In some cases, power consumption of the hardware components—including, but not limited to, the central processing unit ("CPU"), the hard disk, the memory (or RAM), the network device, the graphics processors, or the like—may be measured during the performance tests. A power consumption profile for the software application, based on the measured power consumption across different load phases, can then be generated, and based on this profile, the software application can be tuned to achieve improved power efficiency. In other words, the software application can be modified so as to achieve a match between the computation output or load imposed by the software application and the power consumption of the hardware components as a result of execution of the software application.

The software applications under evaluation can be any type of software application that is typically executed by a computing device, including, but not limited to, a mobile software application, a tablet computer software application, a standalone desktop software application, an enterprise software application, or a software application deployed in a virtualized environment.

Implementing green software applications, in various embodiments, might include categorizing the software application based in part or in whole on measured or calculated power consumption of the hardware components. The categories might include, but is not limited to, a CPU intensive application, a memory intensive application, a disk I/O intensive application, network intensive application, a graphics intensive application, or a combination of one or more of these categories ("combination intensive application"). Based on the category, the subject software application may be further evaluated using a root cause analysis to determine underlying causes of the power inefficiencies. With the results from the root cause analysis, solution approaches may be determined to minimize or eliminate the power inefficiency in the software application. A user can then be provided with a summary of the problem associated with the evaluated software application, the GAE Rating for the software application, the operating system and hardware platform details with respect to which the software application was certified, along with solution approaches that the user can take to tune the software application to achieve improved power efficiency. In some cases, the user might be given the option to initiate automated processes for performing the tuning of the evaluated software applications.

To determine whether or not to implement the processes discussed above for achieving green software applications, one must first determine what the power efficiencies are for the subject software applications. To that end, various techniques are provided for certifying software applications with a GAE rating, which is used to label software applications according to levels of power efficiency. For the certification process, effective power consumption and effective computational work performed by the hardware components might first be calculated for each load phase in the operational cycle of the software application. This might include a daily cycle, a weekly cycle, a monthly cycle, a yearly cycle, or a life cycle of the software application. The load phases might include, without limitation, an initiation phase, a low load phase, an efficient load phase, a maximum load phase, an idle load phase, and a pre-stop/stop phase in any or all of these operational cycles.

Based on these calculated values, the efficiency rating for the software application may be calculated for each load phase, and the software application can, in some instances, be categorized into appropriate efficiency categories. In some cases, the software applications might be classified in terms of output/load level versus power consumption level of affected hardware components. For example, the software applications might be categorized into one of four efficiency quadrants, each quadrant representing a high or low level of output/load while at the same time representing a high or low level of power consumption. The most power efficient software applications might be categorized into the high output/low power quadrant, while the least efficient software applications might be categorized into the low output/high power quadrant, and intermediate efficiency software applications might be categorized into one of the other two quadrants.

An overall GAE rating might be calculated for the evaluated software application based on the quadrant in which it has been categorized and/or based on its calculated efficiency rating for each load phase. In some instances, the overall GAE rating might be a standard average, a weighted average, or some other compiled representation of the calculated efficiency ratings over all the load phases. The software application can then be certified with the calculated GAE rating, which might be in the form of a percentage efficiency value, a quadrant designation (e.g., a color designation, an alphanumeric designation, a numeric designation, an alphabetical designation, or the like), an appropriate efficiency notation, or a combination thereof.

As an overview, green software application performance management may, in many cases, provide significant cost savings by reducing energy consumption caused by software applications. Such management might help any information technology ("IT") team or service providers to measure discrete energy consumption by each software application across respective workload models as well as areas where energy may be wasted, identify critical areas where improper hardware matching for applications may be done, perform efficient capacity planning and reduce carbon foot print and energy cost, or the like. The key benefits may include one or more of the following: (1) Precise energy consumption and Carbon foot print calculation for each software application across different phases of work load; (2) Determining application efficiency and GSA Efficiency Rating, and identifying critical areas where energy consumption is high due to intense hardware utilization (like CPU, RAM, DISK, NETWORK, Etc.); (3) Efficient Capacity Planning; and (4) Creating solutions for efficient power governance and reduction of carbon foot print at the application level.

Herein, "non-green software applications" might refer to conventional software applications that have not been tuned or designed to match computational output with hardware power consumption. As such, these non-green software applications might result in consumption of excessive power (by hardware components including the CPU running these software applications, RAM, disk input/output devices, network devices, graphics processors, and/or the like), due, e.g., to one or more root causes. The root causes might include, but are not limited to, latency in resource release, inefficient computational logic, creation of large and long-lived objects in memory, storage of large chunks of data (i.e., large sized data or large number of packets of data), heavy data transfer, or hardware/software mismatch, etc. In contrast, "green software applications" might refer to software applications that have been tuned or designed to match computational output with hardware power consumption. This matching might be achieved, for example, by addressing one or more of the root causes above, or the like.

Herein also, "efficiency values" might refer to "power efficiency values," which might be determined based on efficiency of effective computational output as compared with hardware power consumption (i.e., based on matching of effective computational output to power consumption across different phases of load). In some instances, the term "high output-low power" might refer to high effective computational output caused by execution of a software application, while causing low power consumption by hardware components. Such high efficiency software applications, which might have efficiency values in the range of 75 to 100%, might be referred to herein as "Green Applications" or "Green Apps." Similarly, the term "high output-high power" might refer to high effective computational output caused by execution of a software application, while causing high power consumption by hardware components. Such medium-high efficiency software applications, which might have efficiency values in the range of 50 to 75%, might be referred to herein as "Amber Applications" or "Amber Apps." The term "low output-low power" might refer to low effective computational output caused by execution of a software application, while causing low power consumption by hardware components. Such medium-low efficiency software applications, which might have efficiency values in the range of 25 to 50%, might be referred to herein as "Blue Applications" or "Blue Apps." Finally, the term "low output-high power" might refer to low effective computational output caused by execution of a software application, while causing high power consumption by hardware components. Such low efficiency software applications, which might have efficiency values in the range of less than 25%, might be referred to herein as "Red Applications" or "Red Apps." These four ranges or categories define the four efficiency quadrants that track output/load versus power consumption (which is shown, e.g., in FIG. 8A).

In some instances, performance testing might include one or more of an isolated approach or a non-isolated approach. In an isolated approach, testing might be performed by deploying the software application in isolation in a "test rig" (i.e., a facility or environment to characterize power consumption for different load conditions by load testing a single software application as per work load model in an isolated manner). The dependent applications and/or services might remain wired as usual; alternatively, the software application might be run while simulating the dependent applications and/or services. A "test rig" might be selected for one or more of the following capabilities or characteristics: (1) a harness to obtain a power profile of a software application; (2) agents to monitor performance of the software application; (3) application lifecycle support and/or software configuration as available in the production environment; and (4) capability to connect to all the application dependencies as in the production environment. The harness, in some instances, might include hardware interfaces at the mother board level and/or software tools. These might include instrumentation to measure power consumption by each hardware component, instrumentation to measure power consumption by the system as a whole, or both. If power consumption instrumentation is limited or not possible, power consumption can be determined by extrapolating hardware utilization using the hardware vendor provided Utilization versus Power Consumption charts.

In a non-isolated approach, the software application might be deployed in a shared environment (e.g., a test environment), while sharing space with other applications. This might include an existing test environment, in which case detailed study might be performed to understand the environmental differences (e.g., in software and hardware capacity). The environmental differences might be required to extrapolate the energy and performance efficiency of the software application. Power consumption measurements might also be taken for the environment (e.g., a server) as a whole, where precise application level consumption might not be easily determined (if at all). In this approach, the hardware utilization data might be obtained and the power consumption might be extrapolated using the respective vendor-provided utilization/power characteristics graph (for example, a DDR3 1600 RAM might consume 5 W at idle phase and 21 W at peak utilization).

Hardware utilization versus power consumption behavior might not be linear in most cases. As such, appropriate graphical curve fitting approaches might need to be identified and a precise relationship might need to be derived. Based on the appropriate graphical curve fitting approaches and/or the derived precise relationship, power utilization at each individual hardware component may be derived.

The various embodiments described below utilize one of two approaches for calculating efficiency: (a) Computational Work ("CW") Approach; and (b) Justified Software Output ("JSO") Approach.

In the CW Approach, the computation work done or performed is analogous to work done by an automobile, for instance, which might include factors such as rolling resistance, coefficient of drag, weight of the car, and the like. The practical work done by the automobile might be calculated based on the following equation:

$$\text{Practical Work Done} = \text{Force} \times \text{Displacement} \times f_n, \quad \text{(Eqn. 1)}$$

where $f_n$ is a coefficient that takes into account factors such as rolling resistance, coefficient of drag, weight of the car, and the like.

Similarly, to calculate the work done by a computing device (e.g., user device, computer, server, or the like) with respect to an application, force can be equated to the CPU processing power, which can be calculated as CPU instructions per second multiplied by a percent average CPU utilization at specific phases of load. Displacement can be equated to the transactions processed, requests processed, throughput, and the like. Weight can be equated to functional factors, including, without limitation, total memory occupancy by the application objects, the number of concurrent users, the number of sessions, and the like. Factors like rolling resistance and drag can be equated to non-functional latency factors including, but not limited to, logging, reporting, lags due to profiling agents, data replication to support failover, garbage collection, defragmentation, and the like. Accordingly, computational work done ("$W_C$") might be calculated based on the following equation:

$$W_C = F_C \times D_C \times f_n, \quad \text{(Eqn. 2)}$$

where $F_C$ is the computation force, $D_C$ is the computational displacement, and $f_n$ is the coefficient, which for purposes of simplification might be equated to computational mass or memory utilized ("$X_{mem}$"). In some cases, $F_C$ might be calculated based on the following equation:

$$F_C = v_{CPU} \times U_{Ave}, \quad \text{(Eqn. 3)}$$

where $v_{CPU}$ is the rate of CPU instructions (i.e., CPU instructions per second), $U_{Ave}$ is the percent average CPU utilization at a specific phase of load.

The total work done ("$W_T$") might be calculated as follows:

$$W_T = \int_{t1}^{t2} F_C \times D_C \times X_{mem}. \quad \text{(Eqn. 4)}$$

The overall efficiency ("$\eta$") might be calculated based on the following equation:

$$\eta = \frac{W_T}{P_T} \times 100\%, \quad \text{(Eqn. 5)}$$

where $P_T$ is the total power consumed in joules.

In some cases, the efficiency might be determined for each phase of load. In an example, where 10% of the time is occupied by the initiation phase, 20% by the low load phase, 40% by the efficient load phase, 10% by the maximum load phase, 15% by the idle load phase, and 5% by the pre-stop/stop phase, an average efficiency ("$\eta_{Ave}$") might be calculated as follows:

$$\eta_{Ave} = 0.1 \times \eta_{Init} + 0.2 \times \eta_{Low} + 0.4 \times \eta_{Eff} + 0.1 \times \eta_{Max} + 0.15 \times \eta_{Idle} + 0.05 \times \eta_{stop}, \quad \text{(Eqn. 6)}$$

where $\eta_{limit}$ is the efficiency during the initiation phase, $\eta_{Low}$ is the efficiency during the low load phase, $\mu_{Eff}$ is the efficiency during the efficient load phase, $\eta_{Max}$ is the efficiency during the maximum load phase, $\eta_{Idle}$ is the efficiency during the idle load phase, and $\eta_{Stop}$ is the efficiency during the pre-stop/stop phase.

In the JSO Approach, JSO units are utilized to compare different software applications of the same type, while in a sense normalizing the results for ease of comparison. At a high level, the steps involved in the JSO Approach might include converting software application output to JSO units, performing load versus JSO comparative analysis, and determining a green software application ("GSA") spectrum classification.

The JSO calculation process flow might include measuring an application's output in a given period, which might comprise throughput, transactions processed, batch/asynchronous processes, workflows completed, and messages published. The JSO calculation process flow might further include listing all possible drag factors impacting the software applications, associating each drag factor to the hardware component impacted (e.g., CPU, RAM, hard disk drive ("HDD" or "Disk"), Network, etc.), determining impact cost factor for each drag factor, based on the software application's maximum hardware component utilization intensity (which might be equal to the percentage of power consumed by the particular hardware from the total power consumption driven by the software application). For a CPU intensive application, the CPU might consume a maximum of 50% of the power consumed in total by all hardware components. The software application might need to be studied and each drag factor might need to be associated with the percentage of number of business functions performed by the software application.

Based on the values above, the coefficient of drag of each drag factor can be calculated and the total coefficient of drag of all factors can be determined as a percentage value. The JSO might be the application output factored with the total coefficient of drag.

An efficient software application or green software application may produce output matching or closely matching the input over different load conditions across its lifecycle. Such matching is an indication that the software application consumes (or causes the associated hardware components to consume) just the required power to provide Justified Software Output at any given point of time. A graph might be drawn with the Y-axis depicting percentage power consumption and percentage output (in JSO units), while the X-axis might depict time in hours. Continuous JSO, based on the software application output, may be plotted, with the maximum value (at 100%) being peak application JSO output. Percentage power consumption may be plotted together on the same graph.

The deviation between the two graphs (JSO output and percentage power consumption) determines the appropriate quadrant in the GSA spectrum, with deviation being based on the following equation:

$$\text{Deviance} = \frac{POWA - JSOA}{JSOA} \times 100\%, \quad \text{(Eqn. 7)}$$

where POWA is the area of the graph and JSOA is the area of the JSO graph.

The Application—GSA Spectrum Classification might be determined based on the following: (a) Green Applications—Deviance of 0% to 25%; (b) Amber Applications—Deviance of 25% to 50%; (c) Blue Applications—Deviance of 50% to 75%; and (d) Red Applications—Deviance of greater than 75%.

We now turn to the embodiments as illustrated by the drawings. FIGS. 1-10 illustrate some of the features of the method, system, and apparatus for certifying software applications with a green applications efficiency ("GAE") rating or some of the features of the method, system, and apparatus for implementing green software applications, both as referred to above. The methods, systems, and apparatuses illustrated by FIGS. 1-10 refer to examples of different embodiments that include various components and steps, which can be considered alternatives or which can be used in conjunction with one another in the various embodiments. The description of the illustrated methods, systems, and apparatuses shown in FIGS. 1-10 is provided for purposes of illustration and should not be considered to limit the scope of the different embodiments.

With reference to the figures, FIG. 1 is a schematic diagram illustrating an exemplary system 100 for certifying software applications with a green applications efficiency ("GAE") rating or for implementing green software applications, in accordance with various embodiments. In system 100 as shown in FIG. 1, green software applications system 100 might comprise a computing device 105, which might be any suitable device including, but not limited to, a desktop computer, a laptop computer, a tablet computer, a smart phone, a mobile phone, or a personal digital assistant ("PDA"), and the like. In some cases, the computing device 105 might comprise at least one of one or more processors 110, one or more memory devices 115, one or more displays 120, one or more graphics processors 125, one or more measurement tools 130, one or more disk input/output devices 135, one or more network devices 140, and the like, or any combination thereof. The one or more displays 120 might include one or more touchscreen displays, one or more non-touchscreen displays, or a combination of touchscreen and non-touchscreen displays. In addition, the one or more network devices 140 may be embodied as one or more transceivers, as one or more pairs of separate transmitters and receivers, or as one or more separate and unpaired transmitters and receivers, network interface cards, or the like.

In some embodiments, green software applications system 100 might further comprise one or more networks 145, one or more servers 150, and/or one or more databases 155 (including database 155a communicatively coupled to server 150, database 155b that is indirectly coupled to server 150 via network 145, or the like). The system 100 might also comprise a user device 160 that is separate from computing device 105. User device 160, like computing device 105, might be any suitable device including, but not limited to, a desktop computer, a laptop computer, a tablet computer, a smart phone, a mobile phone, or a personal digital assistant ("PDA"), and the like. In some instances, user device 160 might comprise similar components (e.g., one or more processors, one or more memory devices, one or more displays (including touchscreen and/or non-touchscreen displays), one or more graphics processors, one or more measurement tools, one or more disk input/output devices, one or more network devices, and the like, or any combination thereof) as computing device 105. User device 160 might, according to some embodiments, be in communication with device 105 either via network 145 or via direct wireless connection, or a combination thereof.

In some embodiments, system 100 might be configured to certify software applications with a green applications efficiency ("GAE") rating or the like. In some instances, the processor 110 in computing device 105 might perform one, more, or all of the processes described herein for certifying software applications with a GAE rating. In other cases, the server 150 might perform one, more, or all of the processes described herein for certifying software applications with a GAE rating. In a few embodiments, some of the processes might be performed by device 105, while others might be performed by server 150.

In other words, the system 100, according to some embodiments, might be employed such that the software application to be certified with a GAE Rating might be deployed in one computing device (e.g., computing device 160, which might include, without limitation, a tablet computer, a smart phone, a mobile phone, a PDA, or any suitable handheld device, a laptop computer, a desktop, a server, or the like). Measurement tools (e.g., measurement tools 130) can be internal or external to this computing device 160, or can be a combination of internal and external tools to this computing device 160. The measurement tools might be software based or hardware based. The computing device 160 might communicate with other computing devices over the network 145. Computing device 105 or server 150 might be employed to host GAE software to calculate Justified Software Output, GAE Rating, Measurement of Hardware Utilization, recording/measurement of power consumption, etc. The computing device 160 might communicate with computing device 105 or server 150 via the network 145. Similarly, in some instances, any one or more of computer device 105, device 160, or server 150 might deploy the software to be certified with the GAE rating while one or more of the other of computer device 105, device 160, or server 150 might be employed to host GAE software to calculate Justified Software Output, GAE Rating, Measurement of Hardware Utilization, recording/measurement of power consumption, etc. In some cases, the same computing device (i.e., device 105, 160, or server 150) might run the software being certified with the GAE rating, while at the same time hosting the GAE software to calculate Justified Software Output, GAE Rating, Measurement of Hardware Utilization, recording/measurement of power consumption, etc.

In use, the processor 110 (of device 105 or device 160) or the server 150 might calculate effective power consumption and effective computational work performed by one or more hardware components (including, without limitation, CPU or processor 110, RAM or memory 115, graphics processor 125, disk input/output device 135, network device 140, or the like), in each load phase of a plurality of load phases, in response to execution of a software application. The software applications being evaluated might include, but are not limited to, a mobile software application, a tablet computer software application, a standalone desktop software application, an enterprise software application, or a software application deployed in a virtualized environment. The power consumption of the one or more hardware components, either individually or collectively, might be measured using measurement tool 130, which might include at least one of a software-based measurement tool, a hardware-based measurement tool, or a combination hardware-software-based measurement tool. The plurality of load phases might comprise an initiation phase, a low load phase, an efficient load phase, a maximum load phase, an idle load phase, and a pre-stop/stop phase, as shown and described in detail below with respect to FIGS. 3 and 4.

The processor 110 or the server 150 might calculate an efficiency rating for the software application, for each load phase, based on the calculated effective power consumption and the calculated effective computational work performed for the software application, for each load phase. The processor 110 or the server 150 might subsequently categorize the software application into one of four efficiency quadrants, based on load and power consumption of the software application, and based on the calculated efficiency rating for the software application. The efficiency quadrants comprise a high output-low power quadrant (corresponding to a "Green Application" or "Green App" which might have an efficiency value between 75 and 100%), a high output-high power quadrant (corresponding to an "Amber Application" or "Amber App" which might have an efficiency value between 50 and 75%), a low output-low power quadrant (corresponding to a "Blue Application" or "Blue App" which might have an efficiency value between 25 and 50%), and a low output-high power quadrant (corresponding to a "Red Application" or "Red App" which might have an efficiency value less than 25%).

According to some embodiments, the calculation of the effective power consumption and the effective computational work performed by one or more hardware components or the calculation of the efficiency rating for the software application might be performed by one of calculation of a Justified Software Output and Software Energy Efficiency (JSO Approach) or calculation of Computational Work Done and Software Energy Efficiency (CW Approach), which are described in detail above. In summary form, calculating the Justified Software Output and Software Energy Efficiency might comprise factoring a drag coefficient associated with each hardware component affected during each load phase, calculating an impact cost factor for each drag coefficient, and calculating the Justified Software Output based on the factored drag coefficient associated with each hardware component affected during each load phase and the calculated impact cost factor for each drag coefficient. Calculating the Computational Work Done and Software Energy Efficiency might comprise calculating a computational force applied, a computational throughput, and computational memory utilization, and calculating the Computational Work Done based on the calculated computational force applied, computational throughput, and computational memory utilization over a predetermined period.

In some cases, the calculation of the effective power consumption and the effective computational work performed by one or more hardware components, in each load phase, in response to execution of the software application, might comprise calculating a total effective power consumption and a total effective computational work performed by the one or more hardware components, in each load phase, in response to execution of a plurality of software applications over a given period of time. Such calculation might further comprise extrapolating an individual effective power consumption and an individual effective computational work performed by the one or more hardware components, in each load phase, for each of the plurality of software applications, based at least in part on pre-calculated load profiles for each of the plurality of software applications Thereafter, the processor 110 or the server 150 might calculate an overall green applications efficiency ("GAE") rating for the software application, based on the categorizing of the software application into one of the four efficiency quadrants, and based on the calculated efficiency rating for the software application for each load phase. The GAE rating is specific to the operating system and the hardware that host the software application. A change in the hardware components and/or operating system might result in different GAE ratings for the same software application. In some cases, the overall GAE rating might be a standard average, a weighted average, or some other compiled representation of the calculated efficiency ratings over all the load phases. In some embodiments, the calculated efficiency rating for each load phase referred to above might correspond to the GAE rating for the software application, in which case, a separate (or overall) GAE rating calculation is not performed. The processor 110 or the server 150 might subsequently certify the software application with the calculated GAE rating (either at each load phase and/or as an overall GAE rating for the software application).

In some cases, the GAE rating for each software application that is evaluated/certified might be sent to a user device associated with a user for presentation to the user along with details of the operating platform and hardware against, or with respect to, which the certification was done (as shown, e.g., in field 840 in FIG. 8B). Other means of communicating with the user, including, but not limited to, e-mail, text messaging, chat messaging, etc., can also be used. An example of a graphical user interface showing such presentation of the GAE rating is shown, e.g., in FIGS. 8A and 8B, as described below. In some cases, the GAE rating might be presented in the form of a percentage efficiency value, one of four color categories, any suitable indicator of efficiency, or any combination thereof.

According to some aspects, system 100 might be configured to implement green software applications. In some instances, the processor 110 in computing device 105 or 160 might perform one, more, or all of the processes described herein for implementing green software applications. In other cases, the server 150 might perform one, more, or all of the processes described herein for implementing green software applications. In a few embodiments, some of the processes might be performed by device 105 or 160, while others might be performed by server 150.

In use, the processor 110 (of device 105 or device 160) or the server 150 might perform one or more performance tests of a software application. The one or more performance tests might include one or more of an isolated approach or a non-isolated approach, as described in detail above. In some cases, the processor 110 or the server 150 might evaluate a performance of the software application during the one or more performance tests. The processor 110 or the server 150 might measure power consumption of one or more hardware components, in response to execution of the software application during the one or more performance tests, as described in detail above. The processor 110 or the server 150 might generate a power consumption profile for the software application, based on the measure power consumption, and might tune the software application, such that power consumption of the one or more hardware components matches a power load caused by execution of the software application, based at least in part on the power consumption profile for the software application.

In some instances, the processor 110 or the server 150 might monitor hardware load for each of a plurality of hardware, in response to execution of a software application, as measured by one or more measurement tools in communication with the computer. The plurality of hardware might comprise one or more central processing units ("CPUs"), one or more memory devices, one or more disk input/output ("I/O") devices, one or more network devices, and one or more graphics processors. In some cases, measuring, with the one or more measurement tools, the hardware load for each of a plurality of hardware, in response to execution of a software application might comprise one or more of extrapolating power consumption based on hardware utilization measurements and reference consumption/utilization charts or directly measuring power consumption.

The processor 110 or the server 150 might categorize the software application as one of a CPU intensive application ("Cat C"), a memory intensive application ("Cat M"), a disk I/O intensive application ("Cat D"), network intensive application ("Cat N"), a graphics intensive application ("Cat G"), or a combination of one or more of these categories ("combination intensive application"; "Cat Mix"), based at least in part on results of the monitoring of the hardware load for each of the plurality of hardware, in response to execution of the software application.

Based on said categorizing, the processor 110 or the server 150 might perform a root cause analysis for inefficiency for the software application. The root cause analysis might reveal one or more root causes, which might comprise latency in resource release, inefficient computational logic, creation of large and long-lived objects in memory, storage of large sized or large number of packets of data, heavy data transfer over network 145 (which might include a local area network ("LAN"), a wide area network ("WAN"), a virtual private network ("VPN"), the Internet, or any other suitable network), and hardware/software mismatch, or the like.

Based on the root cause analysis, the processor 110 or the server 150 might determine one or more solution approaches for minimizing or eliminating inefficiency for the software application. The one or more solution approaches for each of the categories above (e.g., "Cat C" or "Cat M" and the like) are described in detail below with respect to FIGS. 4A-4D and 6.

The processor 110 or the server 150 might thereafter send the one or more solution approaches to one or more user devices for displaying, on the one or more user devices, recommendations for minimizing or eliminating inefficiency for the software application. Hardware details of the hardware platform and/or the operating system hosting the software application might also be sent to the user. In some cases, the one or more solution approaches and/or the hardware details might be sent to the user via e-mail, text messaging, chat messaging, or any other suitable communications methods. An example of a graphical user interface showing such display of the one or more solution approaches (as well as the hardware details) is shown and described in detail below with respect to FIG. 8B.

By tuning or designing the software applications as described above, green software applications may be achieved, along with a reduction in the carbon footprint of the software application hosted in computing device 105, computing device 160, or server 150.

Figure 2:
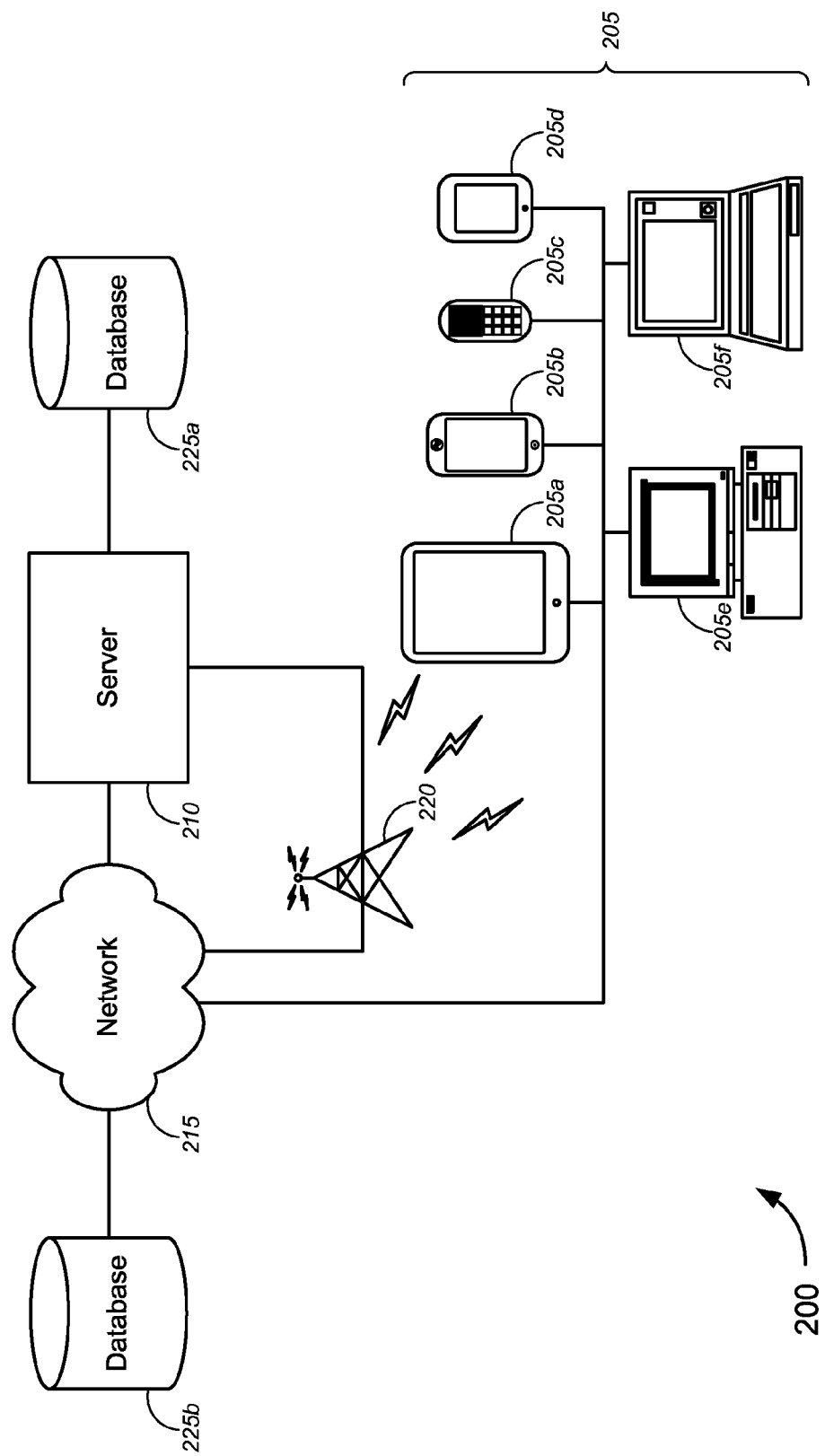
FIG. 2 is a general schematic diagram illustrating another exemplary system for certifying software applications with a green applications efficiency ("GAE") rating or for implementing green software applications, in accordance with various embodiments.

We now turn to FIG. 2, which is a general schematic diagram illustrating an exemplary system 200 for certifying software applications with a green applications efficiency ("GAE") rating or for implementing green software applications, in accordance with various embodiments. In FIG. 2, system 200 might comprise one or more user or computing devices 205, which might comprise any suitable device including, but not limited to, a tablet computer 205a, a smart phone 205b, a mobile phone 205c, a PDA 205d, a desktop computer 205e, a laptop computer 205f, or the like. User device 205 might be operatively coupled with a server 210 over network 215. In some cases, a wired connection (including, without limitation, optical fiber connection, copper wire connection, cable connection, and/or the like) may be made between the user device 205 and the server 210. Alternatively, or in addition, a wireless connection may be implemented between the user device 205 and the server 210, via telecommunications relay systems 220, which might include, without limitation, one or more wireless network interfaces (e.g., wireless modems, wireless access points, and the like), one or more towers, one or more satellites, and the like.

System 200 might further comprise one or more databases 225. The one or more databases 225 may be communicatively coupled with the server 210 (e.g., database 225a), communicatively coupled with the server 210 over network 215 (e.g., database 225b), or any combination of these configurations.

In some embodiments one or more of the user devices 205 or the server 210 might perform the processes performed by the processor 110 or the server 150 for certifying software applications with a green applications efficiency ("GAE") rating or for implementing green software applications, as described in detail above. According to some embodiments, any one of the tablet computer 205a, the smart phone 205b, the mobile phone 205c, the PDA 205d, the desktop computer 205e, the laptop computer 205f, and the server 210 might deploy the software application being certified with the GAE Rating, while one or more of the other of the tablet computer 205a, the smart phone 205b, the mobile phone 205c, the PDA 205d, the desktop computer 205e, the laptop computer 205f, and the server 210 might host the GAE software for performing the certification process as described above. The embodiment of FIG. 2 might otherwise be similar in terms of functionality as the embodiment of FIG. 1 as described in detail above.

Figure 3A:
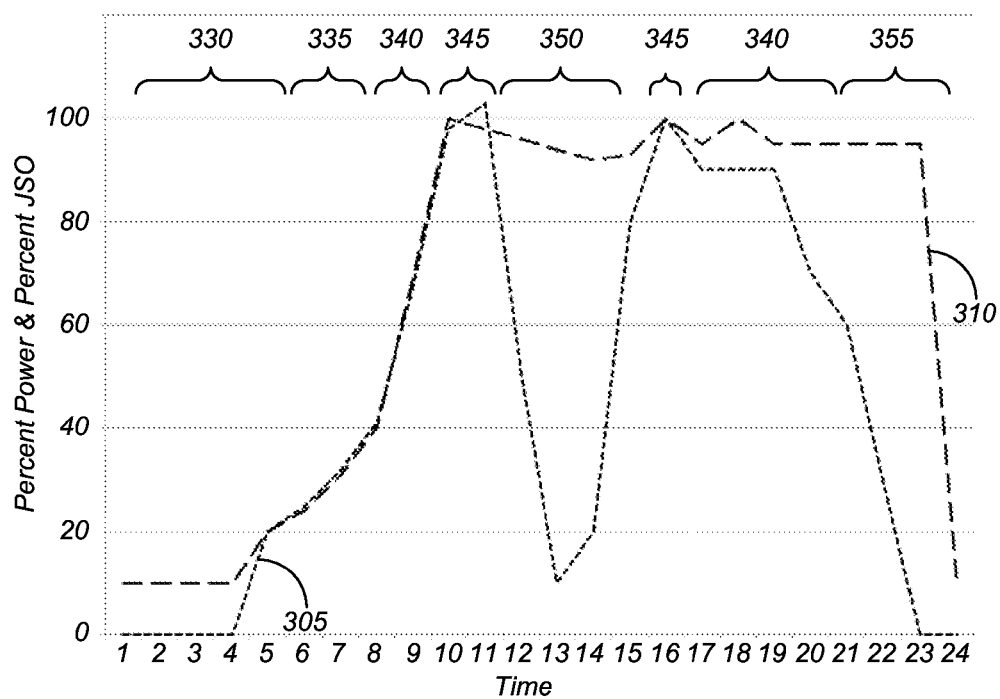
FIG. 3A is a diagram illustrating an example graphical representation of application load versus power profile over a 24 hour period for a computational system executing a software application that is not a green software application.
Figure 3B:
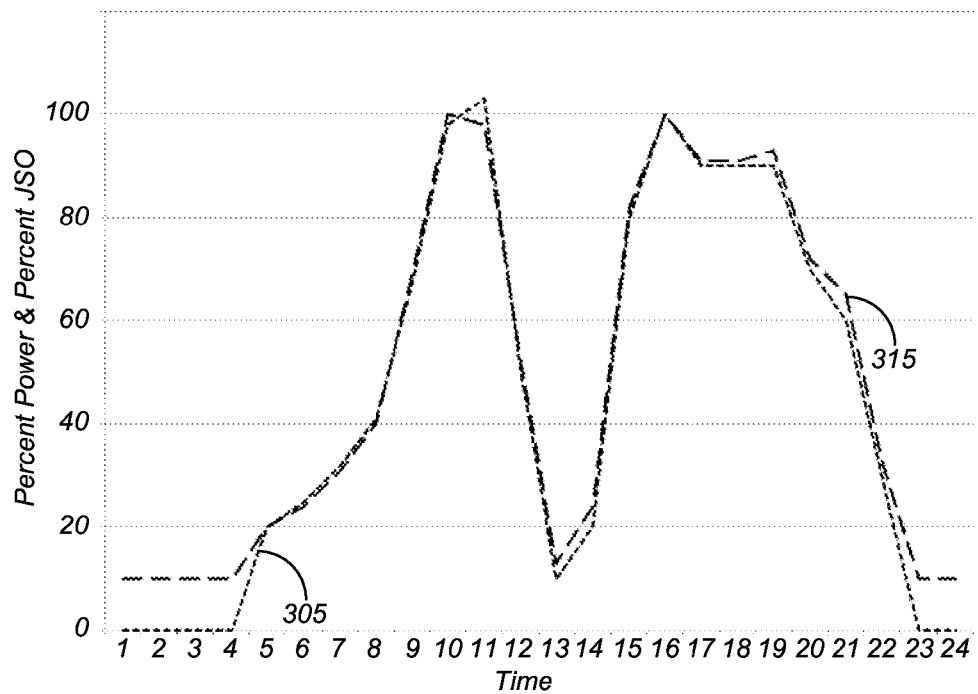
FIG. 3B is a diagram illustrating an exemplary graphical representation of application load versus power profile over a 24 hour period for a computational system executing a green software application, in accordance with various embodiments.

FIGS. 3A and 3B (collectively, "FIG. 3") illustrate the differences in the application load (depicted as percentage JSO values) versus power profiles of a non-green software application and a green software application, respectively. For example, FIG. 3A is a diagram illustrating an example graphical representation of application load (or JSO) versus power profile over a 24 hour period for a computational system executing a software application that is a non-green software application. FIG. 3B is a diagram illustrating an exemplary graphical representation of application load (or JSO) versus power profile over a 24 hour period for a computational system executing a green software application, in accordance with various embodiments.

As shown in FIG. 3A, the Justified Software Output curve 305 represents the computational output to varying load imposed by the execution of a software application. In the example shown in FIG. 3A, the JSO curve 305 goes through load variations, as well as various phases of its life cycle during a 24 hour period. These phases might include, without limitation, an initiation phase 330, a low load phase 335, an efficient load phase 340, a maximum load phase 345, an idle load phase 350, and a pre-stop/stop phase 355. In the initiation phase 330, as shown in FIG. 3A, although zero loads are applied by the software application, the software application (or rather, the hardware components affected by the execution of the software application) consumes about 10% of the maximum power. As the load increases to maximum load, the power consumption, as represented by power consumption curve 310 for a non-green software application, increases in proportion to the load. At around 1100 hours, the load on the software application might reduce to an idle state, going into the idle load phase 350, which might correspond to the user's lunch break, for instance. Importantly, during this idle load phase 350, the power consumption does not reduce and remains above 90%. Similar behavior is shown toward the end of the day, with the power consumption remaining high (e.g., above 90%) despite being in the pre-stop/stop phase 355 where load has been reduced. As discussed above, one or more root causes of such behavior might include, without limitation, latency in resource release, inefficient computational logic, creation of large and long-lived objects in memory, storage of large chunks of data (i.e., large sized data or large number of packets of data), heavy data transfer over a network, or hardware/software mismatch.

By contrast, a tuned or designed green software application might cause the power consumption of hardware components to more closely match the load or output caused by execution of the software application, as shown, e.g., in the application load (or JSO) versus power profile of FIG. 3B. In particular, as shown in the example of FIG. 3B, a green software application having high power efficiency or a high GAE rating (as described below) might cause the power consumption to decrease during the low load phase 335, during the idle load phase 350, and during the pre-stop/stop phase 355, by addressing one or more of the root causes mentioned above. For example, the green software application might be tuned or designed to quickly release resources, contain efficient computational logic, minimize or eliminate large and/or long-lived objects in memory, minimize storage of large chunks of data, reduce heavy data transfer over the network, and/or closely match hardware and software characteristics, or the like.

Figure 4A:
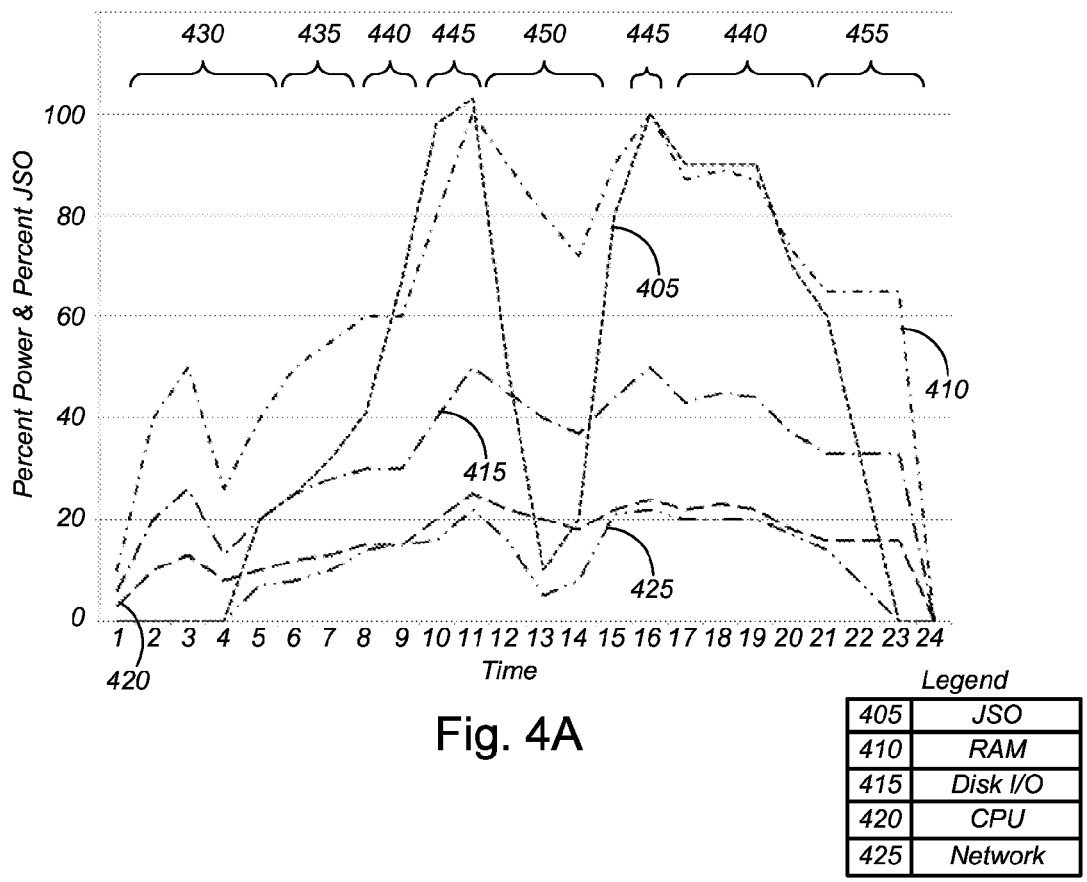
FIG. 4A is a diagram illustrating an example graphical representation of an application power profile for a memory intensive application ("Cat M"), prior to green software application implementation, in accordance with various embodiments.
Figure 4B:
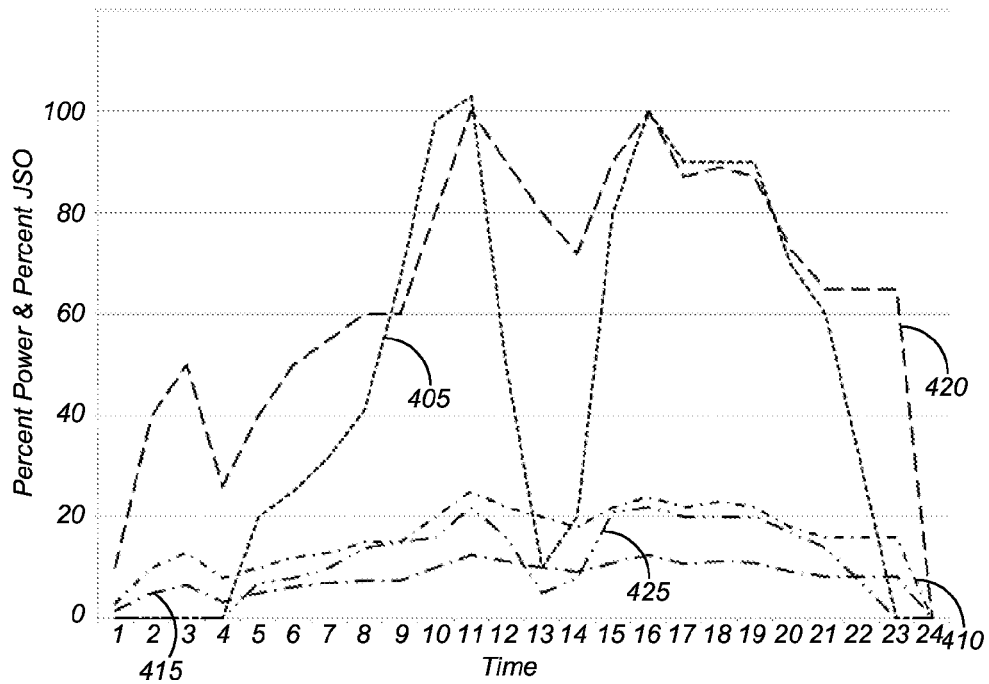
FIG. 4B is a diagram illustrating an example graphical representation of an application power profile for a CPU intensive application ("Cat C"), prior to green software application implementation, in accordance with various embodiments.
Figure 4C:
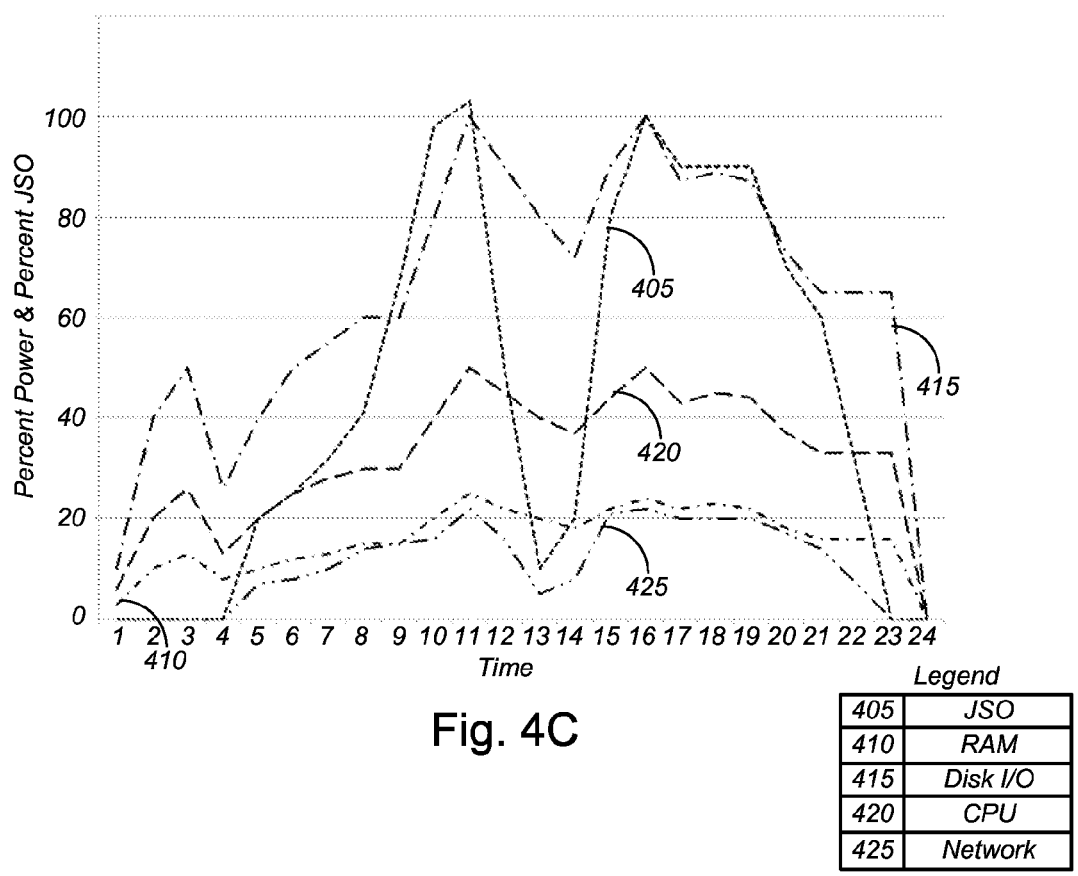
FIG. 4C is a diagram illustrating an example graphical representation of an application power profile for a disk I/O intensive application ("Cat D"), prior to green software application implementation, in accordance with various embodiments.
Figure 4D:
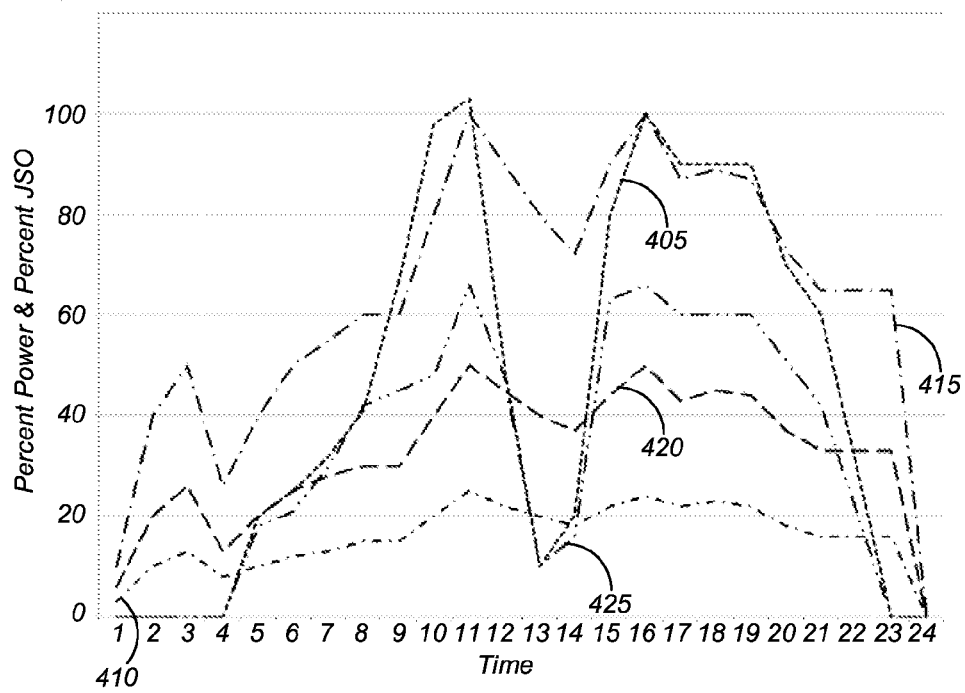
FIG. 4D is a diagram illustrating an example graphical representation of an application power profile for a network intensive application ("Cat N"), prior to green software application implementation, in accordance with various embodiments.

FIGS. 4A-4D (collectively, "FIG. 4") illustrate various application power profile graphs for certain hardware intensive applications, prior to green software application implementation. For instance, FIG. 4A is a diagram illustrating an example graphical representation of an application power profile for a memory intensive application ("Cat M"), prior to green software application implementation, in accordance with various embodiments. FIG. 4B is a diagram illustrating an example graphical representation of an application power profile for a CPU intensive application ("Cat C"), prior to green software application implementation, in accordance with various embodiments. FIG. 4C is a diagram illustrating an example graphical representation of an application power profile for a disk I/O intensive application ("Cat D"), prior to green software application implementation, in accordance with various embodiments. FIG. 4D is a diagram illustrating an example graphical representation of an application power profile for a network intensive application ("Cat N"), prior to green software application implementation, in accordance with various embodiments.

In FIG. 4, for purposes of illustration and for ease of comparison, the JSO curve 405 is the same as the JSO curve 305 in FIG. 3. The RAM or memory curve 410, the Disk I/O curve 415, the CPU curve 420, and the Network curve 425 are shown in relation to the JSO curve 405 in each of the Cat M (FIG. 4A), Cat C (FIG. 4B), Cat D (FIG. 4C), and Cat N (FIG. 4D) conditions.

A Cat M condition might be indicative of high utilization of memory or RAM as compared with utilization of other hardware components, as illustrated by the relatively high RAM curve 410 in FIG. 4A. As with the non-green software application, the profile of which is shown in FIG. 3A, as the load is increased, the RAM utilization is increased, but when the load is reduced, the RAM is not released. As a result, the RAM curve 410 (i.e., RAM utilization) remains high even during the idle load phase 450 and the pre-stop/stop phase 455.

For a memory intensive application or "CAT M" application, one or more solution approaches might comprise determining whether unused objects remain for longer durations in memory, or determining whether large numbers of large-sized objects exist in memory. Based on a determination that unused objects remain for longer durations in memory, memory scavenging operations and defragmentation might be optimized. Based on a determination that large numbers of large-sized objects exist in memory, the large-sized objects might be identified, a cause for the large-sized objects might be determined, and actions to take based on the determined cause for the large-sized objects might also be determined. Other solution approaches might include, without limitation, up scaling or down scaling hardware components according to application requirements, upgrading RAM (e.g., from DDR2 to DDR3 for high RAM utilizations close to 100%, etc.), and/or reducing data caching.

A Cat C condition might be indicative of high utilization of the processor or CPU as compared with utilization of other hardware components, as illustrated by the relatively high CPU curve 420 in FIG. 4B. As with the non-green software application, the profile of which is shown in FIG. 3A, as the load is increased, the CPU utilization is increased, but when the load is reduced, the CPU is not released. As a result, the CPU curve 420 (i.e., CPU utilization) remains high even during the idle load phase 450 and the pre-stop/stop phase 455.

For a CPU intensive application or "CAT C" application, one or more solution approaches might comprise revising thread allocations, reducing busy wait times (or timeouts), optimizing transaction execution times, optimizing input and output operations, optimizing/streamlining data replication, and/or revising compression techniques. Other solution approaches might include, without limitation, streamlining thread execution, configuring thread allocations to service APIs as load based thread allocations and utilizing accurate work load models, establishing priority for fast processing versus parallel processing, selecting appropriate power profiles (e.g., power governors), and/or tuning the software applications to achieve faster CPU/Memory resource release.

A Cat G condition might have similar problems as a Cat C condition. As a result, one or more solution approaches for a Cat C condition might be applicable to a Cat G condition.

A Cat D condition might be indicative of high utilization of the Disk I/O as compared with utilization of other hardware components, as illustrated by the relatively high Disk I/O curve 415 in FIG. 4C. As with the non-green software application, the profile of which is shown in FIG. 3A, as the load is increased, the Disk I/O utilization is increased, but when the load is reduced, the Disk I/O is not proportional. As a result, the Disk I/O curve 415 (i.e., Disk I/O utilization) remains high even during the idle load phase 450 and the pre-stop/stop phase 455.

For a Disk I/O intensive application or "CAT D" application, one or more solution approaches might comprise determining whether the software application is logging excessive amounts of data, determining whether excessive file persistence of the software application is causing high input/output rates, and/or determining whether virtual memory utilization is high. Based on a determination that the software application is logging excessive amounts of data, the software application might be reevaluated to reduce logging excessive amounts of data. Based on a determination that excessive file persistence of the software application is causing high input/output rates, input/output rates might be optimized for excessive file persistence by the software application. Based on a determination that virtual memory utilization is high, garbage-collection-aware virtual memory managers might be installed; alternatively, or in addition, hard disks might be upgraded to hard disks having high input/output rates. Other solution approaches might include, without limitation, optimizing serialization to reduce disk occupancy rates, and/or matching the hard disks to match the application to save power (for improved input/output speed) in order to enhance disk power ratings.

A Cat N condition might be indicative of high utilization of the network devices as compared with utilization of other hardware components, as illustrated by the relatively high Network curve 425 in FIG. 4D compared with the Network curves 425 in FIGS. 4A-4C. As with the non-green software application, the profile of which is shown in FIG. 3A, as the load is increased, the network utilization is increased, but when the load is reduced, the network device is not released. As a result, the Network curve 425 (i.e., Network utilization) remains high even during the idle load phase 450 and the pre-stop/stop phase 455.

For a network intensive application or "CAT N" application, one or more solution approaches might comprise optimizing timeouts for dependencies, reducing/streamlining transportation of large packets of data or large numbers of packets of data over a network (e.g., network 145 or 215), optimizing data replication, and/or optimizing data pre-fetches/caching. Other solution approaches might include, without limitation, optimizing fine grained input and output.

A Cat Mix condition might be indicative of high utilization of the two or more hardware components as compared with utilization of other hardware components, or high utilization of all hardware components.

For a combination intensive application or "CAT Mix" application, one or more solution approaches might comprise any combination of the solution approaches described above with respect to Cat M, Cat C, Cat G, Cat D, and Cat N applications. For example, some solution approaches might include, without limitation, implementing aggressive scavenging for faster memory release, implementing faster CPU/memory resource release, matching random access memory ("RAM") hardware to RAM utilization, reducing excessive data caching, implementing streamline thread execution, reducing disk occupancy rate, implementing efficient management of virtual memory, matching hardware components according to application characteristics, optimizing data replication, optimizing data pre-fetches and data caching, and/or streamlining transport of large packets of data or large numbers of packets of data over a network (e.g., network 145 or 215).

Figure 5:
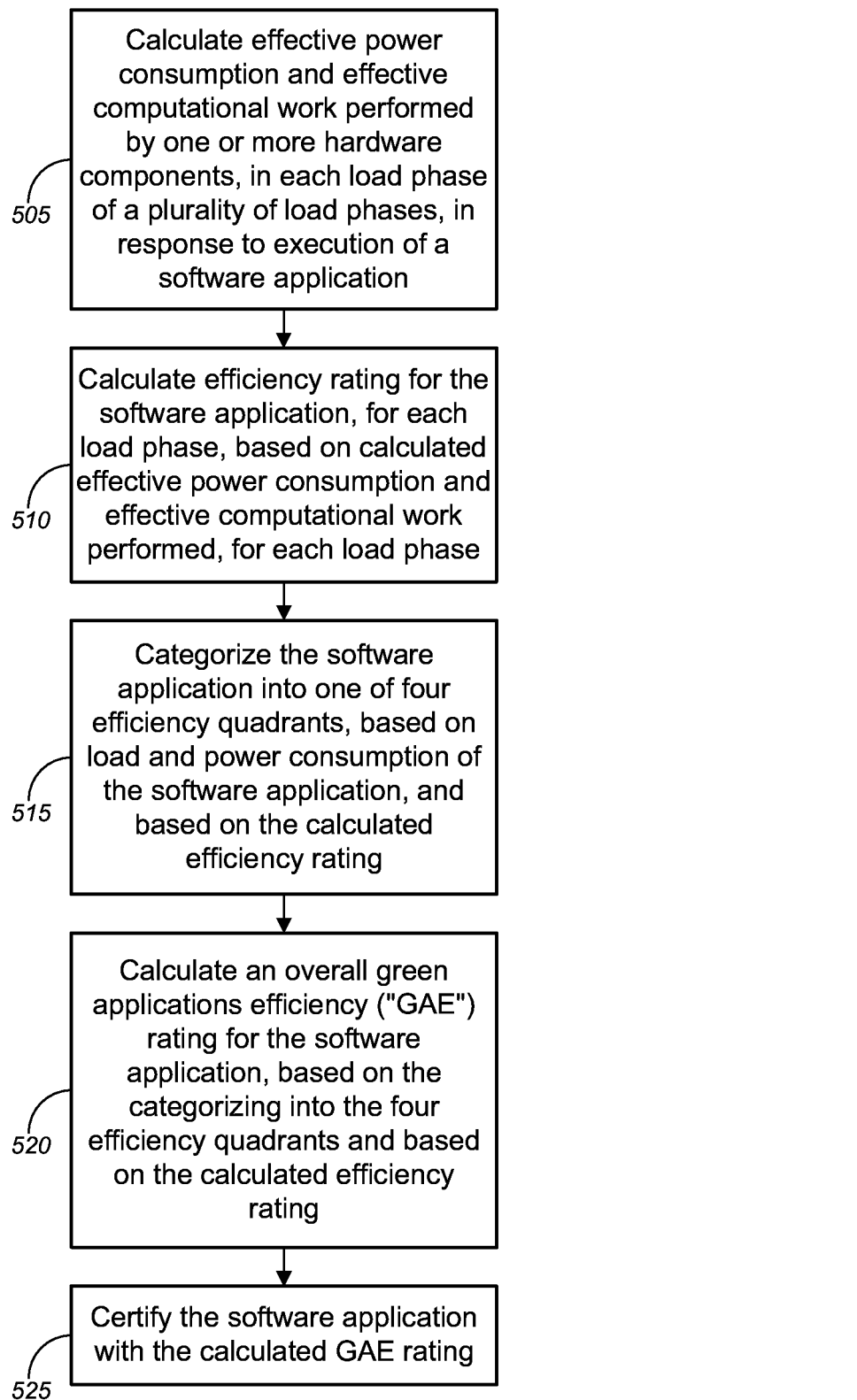
FIG. 5 is a general schematic flow diagram illustrating an exemplary method for certifying software applications with a green applications efficiency ("GAE") rating, in accordance with various embodiments.

FIG. 5 is a general schematic flow diagram illustrating an exemplary method 500 for certifying software applications with a green applications efficiency ("GAE") rating, in accordance with various embodiments. According to some embodiments, one, more, or all the processes in method 500 might be performed by a local user device (e.g., computing device 105 or user device 205 in FIGS. 1 and 2, respectively).

In other embodiments, one, more, or all the processes in method 500 might be performed by a remote user device or server (including, without limitation, server 150, device 160, or server 210).

Method 500 might comprise, at block 505, calculating effective power consumption and effective computational work performed by one or more hardware components, in each load phase of a plurality of load phases, in response to execution of a software application, as measured by one or more measurement tools in communication with the computer. The plurality of load phases might include, without limitation, an initiation phase, a low load phase, an efficient load phase, a maximum load phase, an idle load phase, and a pre-stop/stop phase, as described in detail above with respect to FIGS. 3 and 4.

At block 510, the method 500 might comprise calculating an efficiency rating for the software application, for each load phase, based on the calculated effective power consumption and the calculated effective computational work performed for the software application, for each load phase. Method 500 might further comprise categorizing the software application into one of four efficiency quadrants, based on load and power consumption of the software application, and based on the calculated efficiency rating for the software application for each load phase. The efficiency quadrants comprise a high output-low power quadrant (corresponding to "Green Apps"), a high output-high power quadrant (corresponding to "Amber Apps"), a low output-low power quadrant (corresponding to "Blue Apps"), and a low output-high power quadrant (corresponding to "Red Apps").

Method 500 might comprise, at block 520, calculating an overall green applications efficiency ("GAE") rating for the software application, based on the categorizing of the software application into one of the four efficiency quadrants, and based on the calculated efficiency rating for the software application. The GAE rating is specific to the operating system and the hardware that host the software application. A change in the hardware components and/or operating system might result in different GAE ratings for the same software application. In some cases, the overall GAE rating might be a standard average, a weighted average, or some other compiled representation of the calculated efficiency ratings over all the load phases. In some embodiments, the calculated efficiency rating referred to in block 510 above might correspond to the GAE rating for the software application, in which case, a separate (or overall) GAE rating calculation is not performed (i.e., block 520 might, in these cases, be skipped). At block 525, method 500 might further comprise certifying the software application with the calculated GAE rating, which might be the overall GAE rating for the software application (with respect to the hardware and operating system hosting the software application), the GAE for each load phase, or both.

In some instances, method 500 might further comprise transmitting the GAE rating for each software application to a user device associated with a user for presentation of the GAE rating to the user. An example of a graphical user interface showing such presentation of the GAE rating is shown, e.g., in FIGS. 8A and 8B below. In some cases, the GAE rating might be presented in the form of a percentage efficiency value, one of four color categories, any suitable indicator of efficiency, or any combination thereof.

Figure 6:
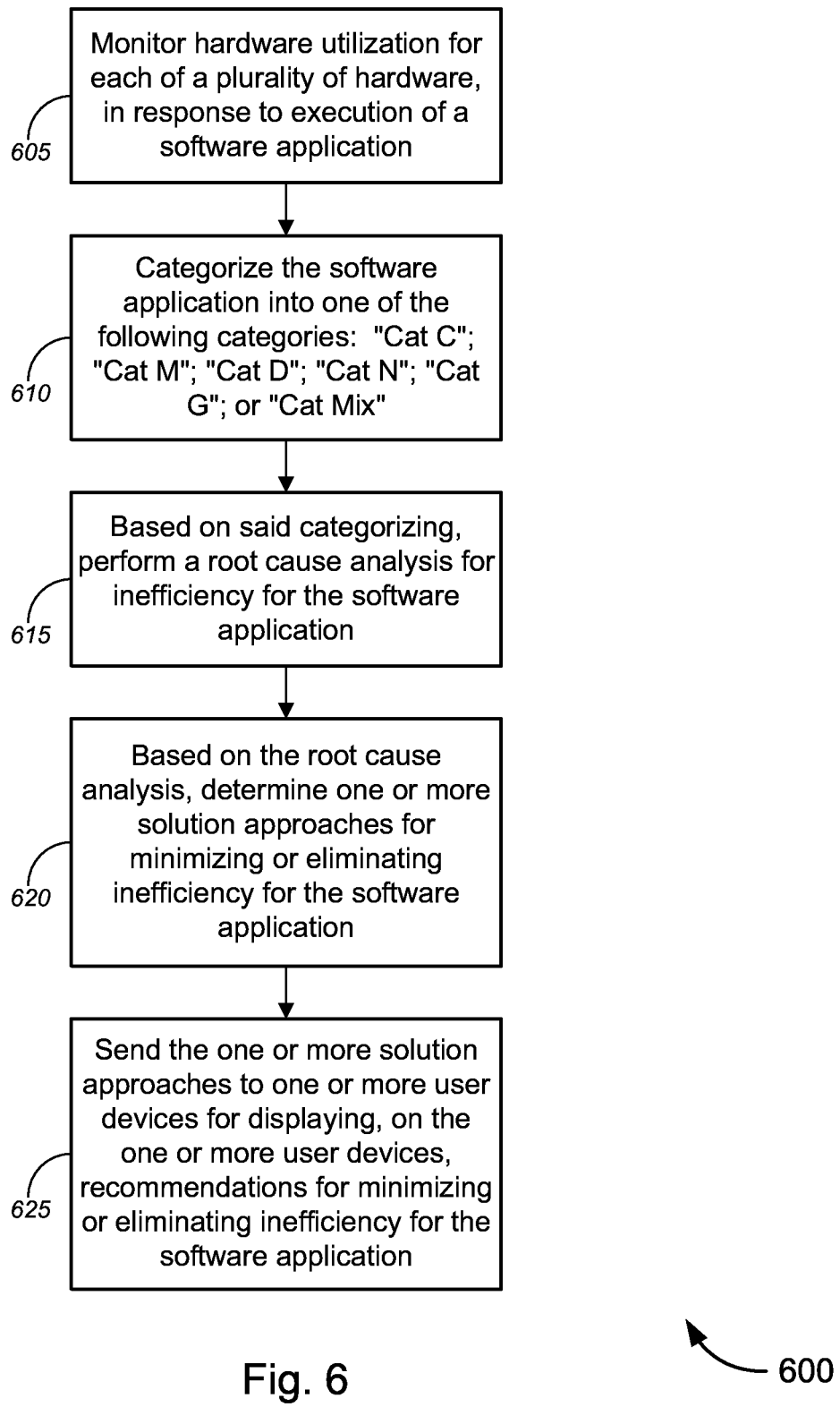
FIG. 6 is a general schematic flow diagram illustrating an exemplary method for implementing green software applications, in accordance with various embodiments.

FIG. 6 is a general schematic flow diagram illustrating an exemplary method 600 for implementing green software applications, in accordance with various embodiments. According to some embodiments, one, more, or all the processes in method 600 might be performed by a local user device (e.g., computing device 105 or user device 205 in FIGS. 1 and 2, respectively). In other embodiments, one, more, or all the processes in method 600 might be performed by a remote user device or server (including, without limitation, server 150, device 160, or server 210).

Method 600 might comprise, at block 605, monitoring hardware utilization (or load) for each of a plurality of hardware components (including, without limitation, CPU, memory, disk input/output, graphical processor(s) and network, or the like). Monitoring of the hardware utilization (or load) might be implemented using any appropriate measurement tool, including, but not limited to, a software-based measurement tool, a hardware-based measurement tool, or a combination hardware-software-based measurement tool.

At block 610, the method 600 might comprise categorizing the software application as one of a CPU intensive application ("CAT C" application), a memory intensive application ("CAT M" application), a disk I/O intensive application ("CAT D" application), network intensive application ("CAT N" application), a graphics intensive application ("CAT G" application), or a combination of one or more of these categories ("combination intensive application"; "CAT Mix" application). Categorizing, in some instances, might be based at least in part on results of the monitoring of the hardware utilization (or load) for each of the plurality of hardware, in response to execution of the software application.

Based on said categorizing, a root cause analysis for inefficiency for the software application might be performed, at block 615. Based on the root cause analysis, one or more solution approaches might be determined for minimizing or eliminating inefficiency for the software application (block 620). For example, for a CPU intensive application ("CAT C" application), the one or more solution approaches might comprise one or more of revising thread allocations, reducing busy wait times, optimizing transaction execution times, optimizing input and output operations, optimizing data replication, or revising compression techniques.

For a memory intensive application ("CAT M" application), the one or more solution approaches might comprise one or more of determining whether unused objects remain for longer durations in memory or determining whether large numbers of large-sized objects exist in memory. The one or more solution approaches might further comprise optimizing, based on a determination that unused objects remain for longer durations in memory, memory scavenging operations and defragmentation. The one or more solution approaches might further comprise, based on a determination that large numbers of large-sized objects exist in memory, identifying said large-sized objects, determining a cause for the large-sized objects, and determining actions to take based on the determined cause for the large-sized objects.

For a disk I/O intensive application ("CAT D" application), the one or more solution approaches might comprise one or more of determining whether the software application is logging excessive amounts of data, determining whether excessive file persistence of the software application is causing high input/output rates, or determining whether virtual memory utilization is high. The one or more solution approaches might further comprise reevaluating, based on a determination that the software application is logging excessive amounts of data, the software application; optimizing, based on a determination that excessive file persistence of the software application is causing high input/output rates, input/output rates for excessive file persistence by the software application; and performing, based on a determination that virtual memory utilization is high, one or more of installing garbage-collection-aware virtual memory managers or upgrading hard disks to hard disks having high input/output rates.

For a graphics intensive application ("CAT G" application), the one or more solution approaches for a Cat C application might be applicable. For a network intensive application ("CAT N" application), the one or more solution approaches might comprise one or more of optimizing timeouts for dependencies, reducing transportation of large packets of data or large numbers of packets of data over a network (e.g., network 145 or 215), optimizing data replication, or optimizing caching.

For a combination intensive application ("CAT Mix" application), the one or more solution approaches might comprise one or more of implementing aggressive scavenging for faster memory release, implementing faster CPU/memory resource release, matching random access memory ("RAM") hardware to RAM utilization, reducing excessive data caching, implementing streamline thread execution, reducing disk occupancy rate, implementing efficient management of virtual memory, matching hardware components according to application characteristics, optimizing data replication, optimizing data pre-fetches and data caching, or streamlining transport of large packets of data or large numbers of packets of data over a network (e.g., network 145 or 215).

At block 625, the one or more solution approaches might be sent to one or more user devices (e.g., user device 105 or 205) for displaying, on the one or more user devices, recommendations for minimizing or eliminating inefficiency for the software application. The hardware details associated with evaluation of the software application (e.g., the hardware and the operating system hosting the software application) may also be sent and/or presented to the user. Other means of communicating the one or more solution approaches (and/or the hardware details) with the user might include, but is not limited to, e-mail, text messaging, chat messaging, or the like.

Figure 7:
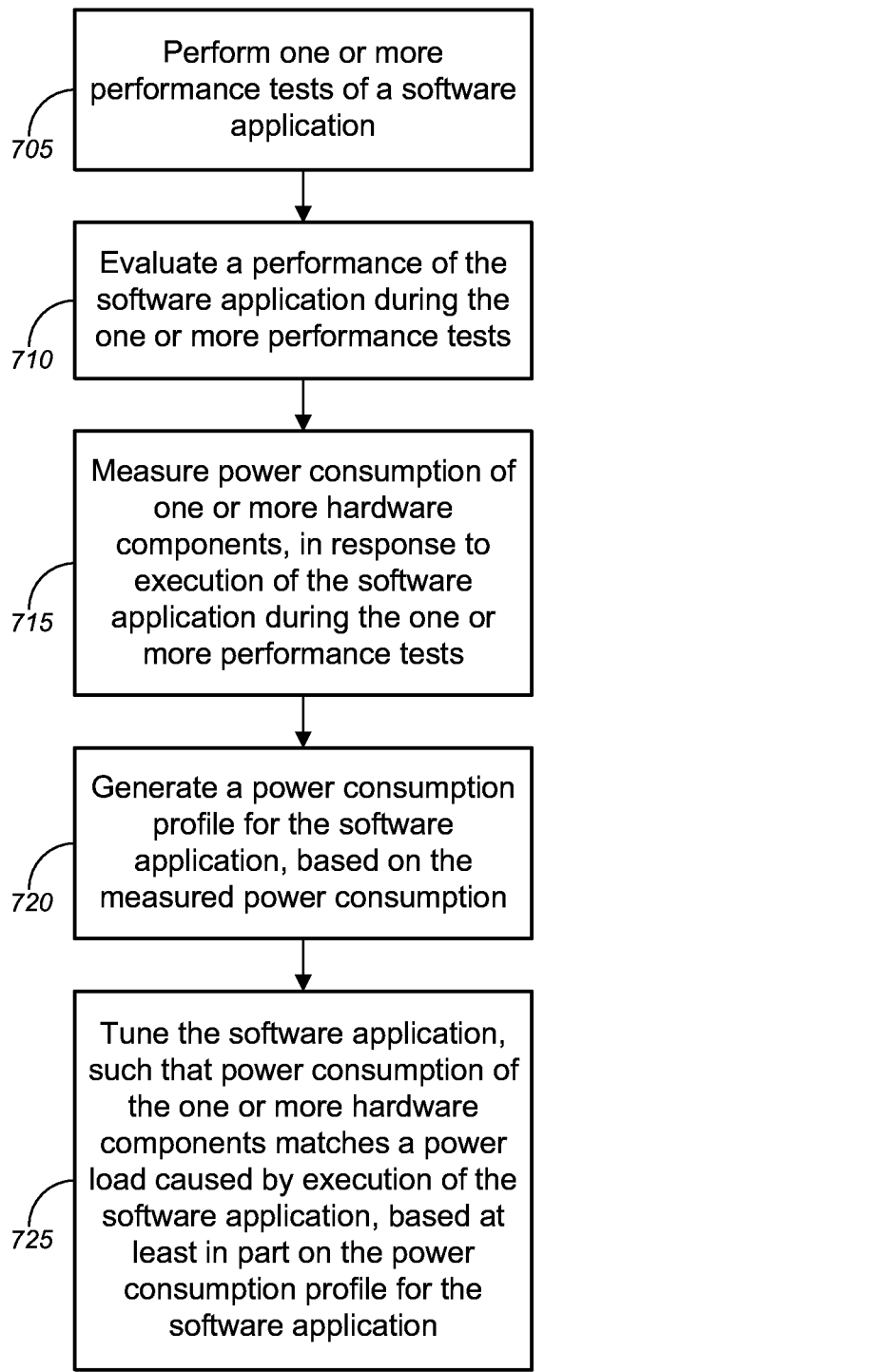
FIG. 7 is a general schematic flow diagram illustrating another exemplary method for implementing green software applications, in accordance with various embodiments.

FIG. 7 is a general schematic flow diagram illustrating an exemplary method 700 for implementing green software applications, in accordance with various embodiments. According to some embodiments, one, more, or all the processes in method 700 might be performed by a local user device (e.g., computing device 105 or user device 205 in FIGS. 1 and 2, respectively). In other embodiments, one, more, or all the processes in method 700 might be performed by a remote user device or server (including, without limitation, server 150, device 160, or server 210).

At block 705, method 700 might comprise performing one or more performance tests of a software application. In some instances, performance testing might include one or more of an isolated approach or a non-isolated approach, as described in detail above. In some embodiments, a performance of the software application during the one or more performance tests might be evaluated (block 710), according to the one or more techniques described above. The method 700 might further comprise, at block 715, measuring power consumption of one or more hardware components (including, without limitation, CPU, memory, disk input/output, graphical processor(s) and network, or the like).

At block 720, a power consumption profile might be generated for the software application, based on the measured power consumption. The software application might subsequently, at block 725, be tuned such that the power consumption of the one or more hardware components matches, or substantially matches (i.e., matches within a predetermined threshold amount (including, but not limited to, a percentage value of 1, 2, 3, 5, 10, 15, or 20%, or the like)), a power load caused by execution of the software application. In some cases, such tuning of the software application might be based at least in part on the generated power consumption profile for the software application. According to some embodiments, tuning might be automatically performed by the computing device or server, based on the power consumption profile for the software application. In other embodiments, tuning might be performed manually, based on the power consumption profile for the software application. This activity can be done in conjunction with efficiency rating (e.g., GAE rating) of the software application. In any event, this activity might provide clear cut areas of excessive power consumption by particular hardware component(s).

According to some embodiments, processes at blocks 705 to 725 of method 700 might be repeated as necessary or as desired. The user interfaces as shown in FIGS. 8A and 8B below illustrate how the efficiency ratings, additional details (e.g., hardware details and the like), and solution approaches/recommendations might be communicated to the user. For example, the GAE Certificate or Rating might be associated with the hardware platform and/or operating system hosting the software application under evaluation. As such, details of the hardware platform and/or the operating system with respect to which the software application was certified may be communicated to the user along with the GAE Rating (as shown, e.g., in FIG. 8B).

Figure 8:
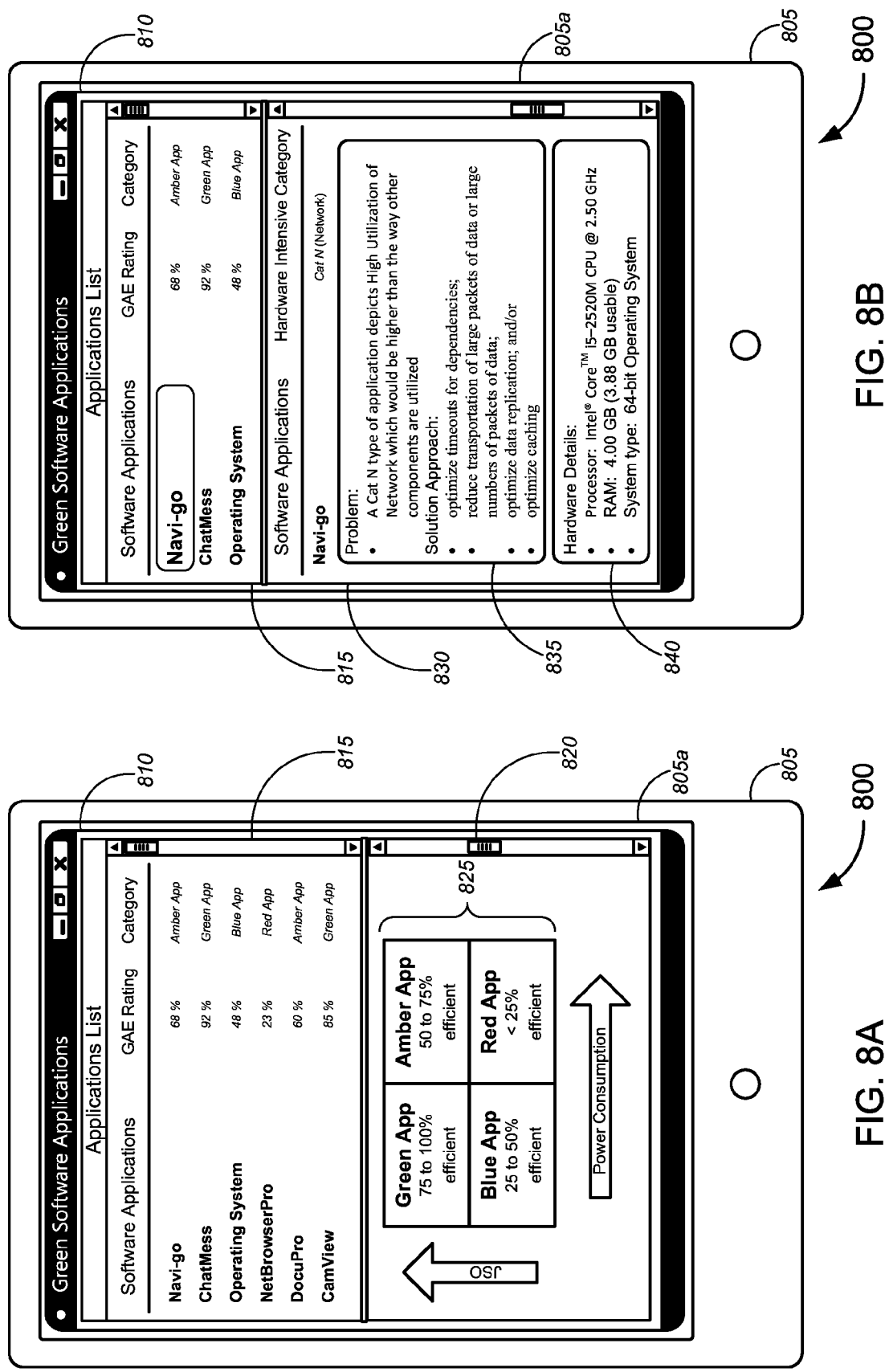
FIGS. 8A-8B are illustrations of mobile user devices used by users that present exemplary graphical user interfaces for GAE rating certification of software applications and/or implementation of green software applications, in accordance with various embodiments.

FIGS. 8A-8B (collectively, "FIG. 8") are illustrations of mobile user devices 800 used by users that present exemplary graphical user interfaces 810 for GAE rating certification of software applications and/or implementation of green software applications, in accordance with various embodiments. For purposes of illustration only, user device 800 in FIG. 8 is shown as a tablet computer, but can be any user computer or user device including, but not limited to, a desktop or PC, a laptop computer, a tablet computer, a smart phone, a mobile phone, or the like—such as tablet computer 205a, smart phone 205b, mobile phone 205c, PDA 205d, desktop computer 205e, or laptop computer 205f, as shown in FIG. 2. User device 800 might comprise device housing 805, display screen 805a, and the like. Display screen 805a might comprise a touchscreen display, a non-touchscreen display, or the like. Displayed on the display screen 805a might be a graphical user interface ("GUI") 810, which may be a free floating GUI window filling a portion of the display screen 805a or may be a software application that fills the entire display screen 805a. In some cases, the GUI 810 might comprise a window that might be divided into two or more panels 815, 820, and 830, e.g., by using a split screen arrangement or a separate window arrangement (which might stack or tile the separate windows). Alternatively, the two or more panels 815, 820, and 830 might be independent windows or related but separate windows.

In FIG. 8A, the user device 800 might perform one, more, or all of the processes described above for certifying various software applications with a green applications efficiency ("GAE") rating, which might be a GAE rating for one or more load phases and/or an overall GAE rating. Alternatively, or additionally, a server (such as server 150 or 210 in FIGS. 1 and 2, respectively) might perform one, more, or all of the processes described above for certifying the various software applications with the GAE rating. According to some embodiments, the GUI 810 might comprise a panel 815 that might display a list of software applications, which might include one or more of a navigation software application, a chat messaging software application, operating system software application, an Internet browser, a document viewer software application (which might include a .PDF or .PS document reader, a word processor, a spreadsheet maker/editor, a presentation making utility, a document publishing utility, and/or other document management/making/editing utility, or the like), or other software applications that a user might install on the user device 800.

In panel 820, the quadrant system 825 used to represent the certification under the GAE rating system might be displayed. The quadrant system 825 might be divided into four quadrants (i.e., a high output-low power quadrant, a high output-high power quadrant, a low output-low power quadrant, and a low output-high power quadrant) according to load (or JSO) and power consumption, and might divide all software applications into one of four color categories each corresponding to each of the four quadrants, as follows: (i) Green Applications (or "Green Apps"); (ii) Amber Applications (or "Amber Apps"); (iii) Blue Applications (or "Blue Apps"); and (iv) Red Applications (or "Red Apps"). Green Apps, which are characterized by high output and low power, might include software applications that have a 75 to 100% efficiency in terms of matching power consumption to load or JSO (similar to the load/power matching shown, e.g., in the application load (or JSO) versus power profile of FIG. 3B). Amber Apps, which are characterized by high output and high power, might include software applications that have a 50 to 75% efficiency. Blue Apps, which are characterized by low output and low power, might include software applications that have a 25 to 50% efficiency. Red Apps, which are characterized by high output and high power, might include software applications that have a less than 25% efficiency.

After the certification processes described above with respect to FIG. 5, each of the software applications listed in the GUI 810 might be certified with a GAE rating. In some instances, also, an overall GAE rating might be displayed for each software application, while options for expanding the views might be provided so as to present the GAE rating for the software application at each phase of load (in which case, the particular phase of load might also be indicated, e.g., as a textual indicator, a graphic indicator, or the like). In some cases, the GAE Rating might be displayed in terms of a percentage efficiency value. In other cases, the GAE Rating might be displayed as one of the four color categories described above. In yet other cases, the GAE Rating might be displayed as both a percentage efficiency value and one of the four color categories (e.g., as shown in FIG. 8A). Although the GAE Rating is shown and described above in terms of a percentage efficiency value and/or one of four color categories, the various embodiments are not so limited, and the GAE Rating may be displayed as any suitable indicator of efficiency.

As shown in the example embodiment of panel 815 of FIG. 8, some software applications (e.g., ChatMess and CamView) might be certified as Green Apps with percentage ratings between 75 and 100% (e.g., 92% and 85%, respectively). Some software applications (e.g., Navi-go and DocuPro) might be certified as Amber Apps with percentage ratings between 50 and 75% (e.g., 68% and 60%, respectively). Other software applications (e.g., Operating System) might be certified as Blue Apps with percentage ratings between 25 and 50% (e.g., 48%). Yet other software applications (e.g., NetBrowserPro) might be certified as Red Apps with percentage ratings below 25% (e.g., 23%). These example certifications are merely presented for illustration purposes only, and are not intended to limit the scope of the various embodiments. Each software application being certified might be evaluated under the processes that are, for example, outlined in overview above with respect to FIG. 5. Those processes are also described for illustration purposes only, and do not limit the scope of the various embodiments, which might include any suitable evaluation steps for evaluating and certifying the efficiency of any software application, in terms of power consumption versus load/computational output or Justified Software Output.

Turning to FIG. 8B, once a software application has been certified with a GAE rating—or, in some cases, independent of any GAE rating certification—the software applications might be evaluated for implementing green software applications. This might include following some or all of the processes described above with respect to FIG. 6, said processes being described only for purposes of illustration (as any suitable processes for evaluating and recommending ways to improve power/load efficiency of software applications may be implemented). For example, in panel 815, a user might be given the option to select or highlight one or more software applications, one or more GAE categories or values, or the like, as represented, e.g., by the bubble cursor over the selected software application (in this case, Navi-go), by the bold-face typing of the name of the selected software application, by the enlargement of the font of the name of the selected software application, or by any other suitable item selection indicator, or any combination thereof. Selection of one or more software applications, one or more GAE categories or values, or the like might cause a separate panel (in this case, panel 830) to display at least one of a hardware intensive category determined by evaluating the efficiency of the selected software application, one or more problems associated with typical systems under said hardware intensive category, and/or one or more solution approaches for improving the system in view of the identified hardware intensive category and/or the one or more problems associated with typical such systems.

As discussed above, the hardware intensive categories might comprise one of a memory intensive application ("Cat M"), a CPU intensive application ("Cat C"), a disk I/O intensive application ("Cat D"), a graphics intensive application ("Cat G"), a network intensive application ("Cat N"), or a combination intensive application ("Cat Mix"; which is a combination of one or more of the above listed categories). In the example shown in FIG. 8B, after evaluation of the software application Navi-go (e.g., using one, more, or all of the processes described above with respect to FIG. 6), the system might identify and display the hardware intensive category for Navi-go as a Cat N (or network intensive application). In field 835 in panel 830, one or more solution approaches might be presented, either in the form of textual content, audio content, video content, or a combination thereof. In some cases, the problem associated with Cat N type software applications in general or the Navi-go software application specifically might also be presented in field 835 or a separate field that is embodied in panel 830 or in a different panel; similar to the presentation of the solution approaches, the presentation of the problem might take the form of textual content, audio content, video content, or a combination thereof. In the example of FIG. 8B, both the problem and the one or more solution approaches for the Cat N type software application Navi-go are presented in textual content form together in field 835 of panel 830. According to some embodiments, hardware details of the hardware platform and/or the operating system might be presented in field 840 of panel 830 or a separate field that is embodied in panel 830 or in a different panel.

According to some embodiments, a user might be given the option of selecting one, more, or all of the one or more solution approaches, which might result in a utility wizard being invoked that might take the user through the processes for implementing each of the selected solution approaches for tuning the subject software applications.

Thereafter, the user might be provided an option to recertify and/or reevaluate the tuned software applications. Alternatively, the process of modifying the software applications to implement green software application might include automatically recertifying and/or reevaluating the tuned software applications. The results of the recertification and/or the reevaluation might subsequently be presented as described above and shown, e.g., in FIG. 8.

Figure 9:
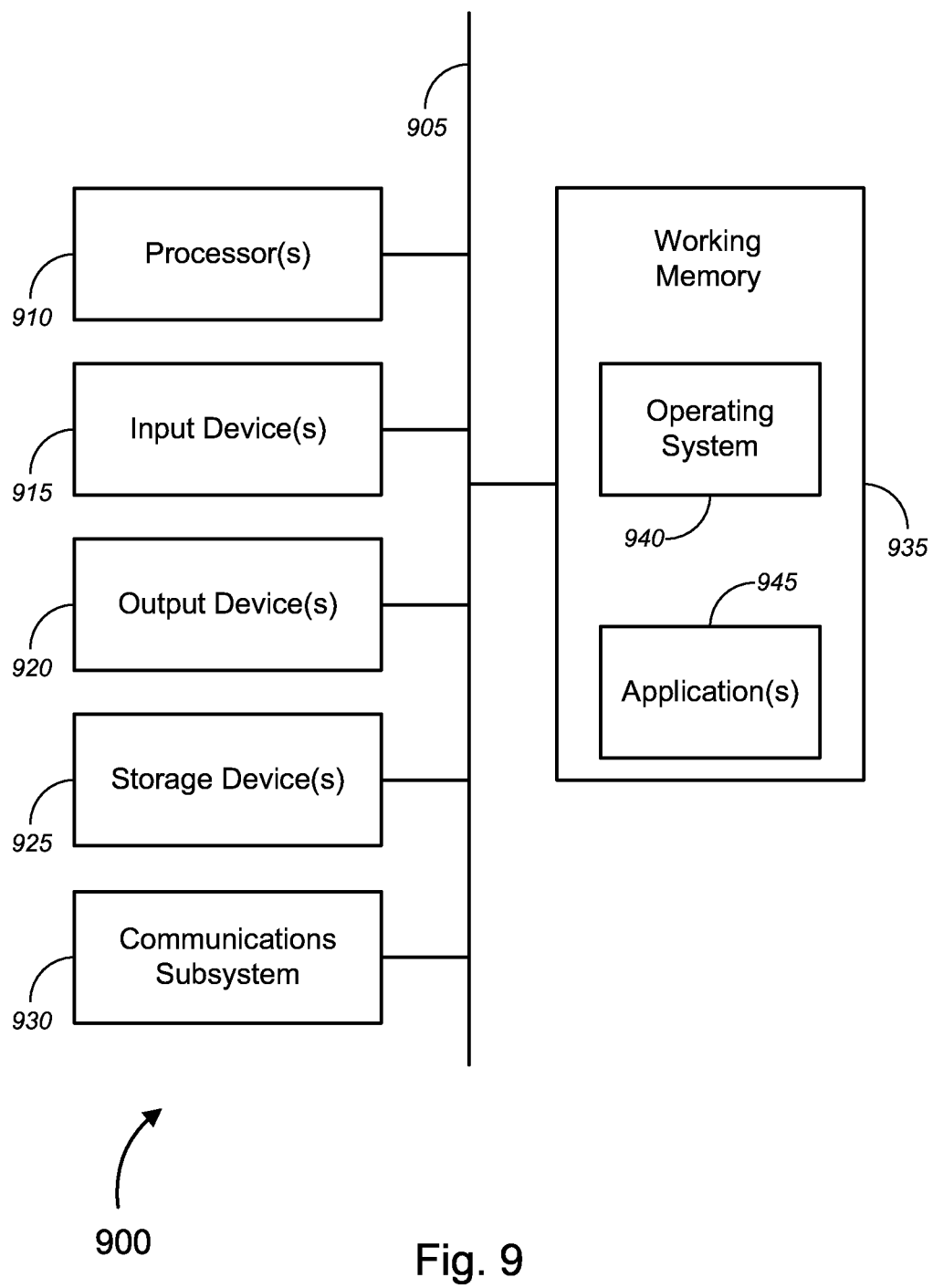
FIG. 9 is a block diagram illustrating an exemplary computer architecture, in accordance with various embodiments.

We now turn to FIG. 9, which is a block diagram illustrating an exemplary computer architecture. FIG. 9 provides a schematic illustration of one embodiment of a computer system 900 that can perform the methods provided by various other embodiments, as described herein, and/or can perform the functions of local computer system 105 or 205, or remote computer system 150 or 210, or other computer systems as described above. It should be noted that FIG. 9 is meant only to provide a generalized illustration of various components, of which one or more, or none, of each may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors, or one or more special-purpose processors such as digital signal processing chips, graphics acceleration processors, or the like; one or more input devices 915, which can include without limitation a mouse, a keyboard, or the like; and one or more output devices 920, which can include without limitation a display device, a printer, or the like.

The computer system 900 may further include, or be in communication with, one or more storage devices 925. The one or more storage devices 925 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 900 might also include a communications subsystem 930, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 930 may permit data to be exchanged with a network (such as network 145 or 215, to name examples), with other computer systems, with any other devices described herein, or with any combination of network, systems, and devices. According to some embodiments, network 145 (as well as network 215) might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 900 will further comprise a working memory 935, which can include a RAM or ROM device, as described above.

The computer system 900 may also comprise software elements, shown as being currently located within the working memory 935, including an operating system 940, device drivers, executable libraries, or other code. The software elements may include one or more application programs 945, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 925 described above. In some cases, the storage medium might be incorporated within a computer system, such as the system 900. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 900, or might take the form of source or installable code. The source or installable code, upon compilation, installation, or both compilation and installation, on the computer system 900 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 900, to perform methods in accordance with various embodiments of the invention. According to a set of embodiments, some or all of the procedures of such methods might be performed by the computer system 900 in response to processor 910 executing one or more sequences of one or more instructions. The one or more instructions might be incorporated into the operating system 940 or other code that may be contained in the working memory 935, such as an application program 945. Such instructions may be read into the working memory 935 from another computer readable medium, such as one or more of the storage devices 925. Merely by way of example, execution of the sequences of instructions contained in the working memory 935 might cause the one or more processors 910 to perform one or more procedures of the methods described herein.

The terms "machine readable medium" and "computer readable medium," as used herein, refer to any medium that participates in providing data that causes a machine to operate in a specific fashion. In an embodiment implemented using the computer system 900, various computer readable media might be involved in providing instructions or code to the one or more processors 910 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 925. Volatile media includes, without limitation, dynamic memory, such as the working memory 935. Transmission media includes, without limitation, coaxial cables, copper wire and fiber optics, including the wires that comprise the bus 905, as well as the various components of the communication subsystem 930, or the media by which the communications subsystem 930 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Figure 10:
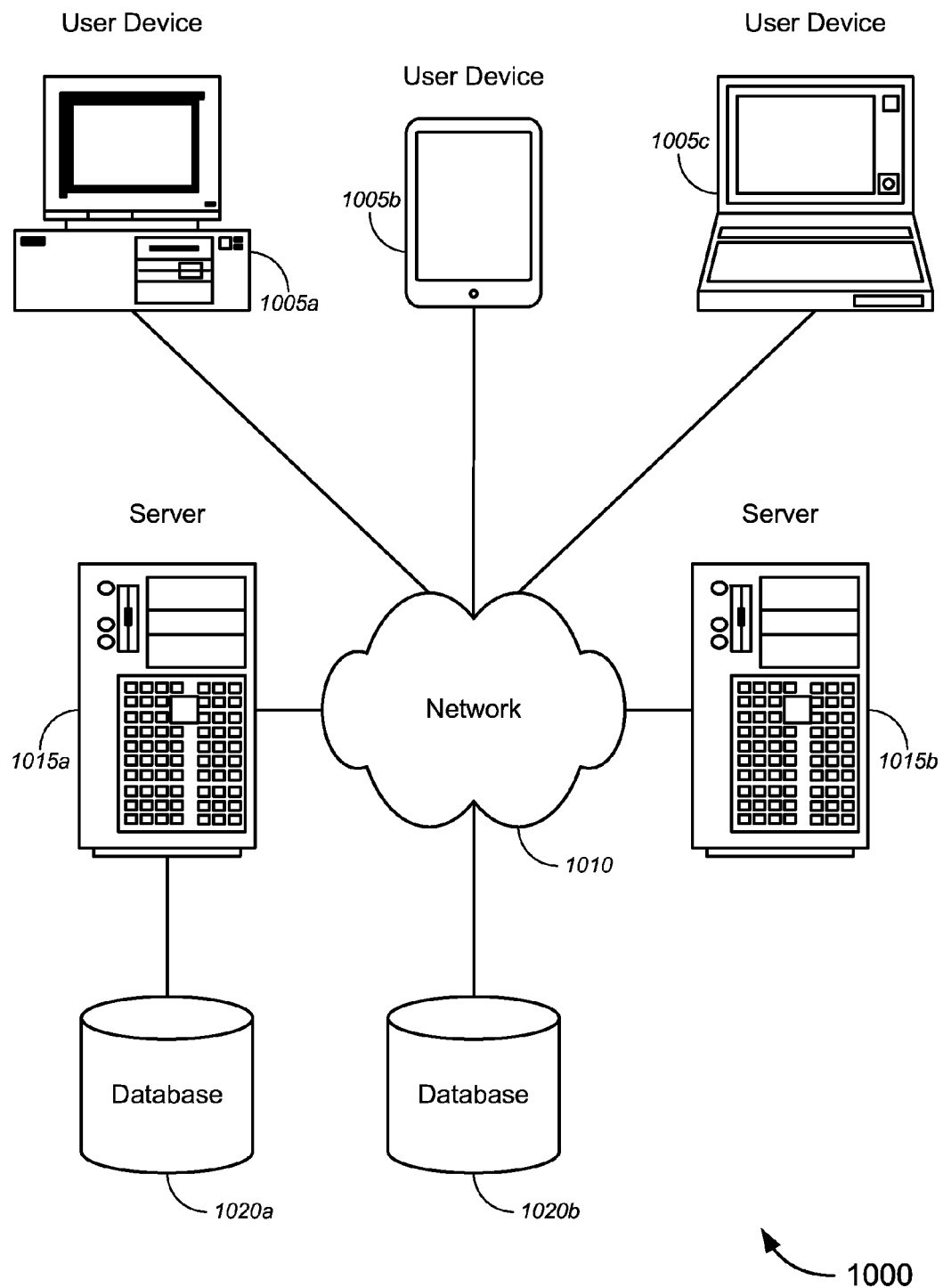
FIG. 10 is a block diagram illustrating a networked system of computers, which can be used in accordance with various embodiments.

As noted above, a set of embodiments comprises methods and systems for certifying software applications with a green applications efficiency ("GAE") rating or methods and systems for implementing green software applications. FIG. 10 illustrates a schematic diagram of a system 1000 that can be used in accordance with one set of embodiments. The system 1000 can include one or more user computers or user devices 1005. A user computer or user device 1005 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer or user device 1005 can also have any of a variety of applications, including one or more applications configured to perform methods provided by various embodiments (as described above, for example), as well as one or more office applications, database client and/or server applications, and/or web browser applications. Alternatively, a user computer or user device 1005 can be any other electronic device, such as a thin-client computer, Internet-enabled mobile telephone, and/or personal digital assistant, capable of communicating via a network (e.g., the network 1010 described below) and/or of displaying and navigating web pages or other types of electronic documents. Although the exemplary system 1000 is shown with three user computers or user devices 1005, any number of user computers or user devices can be supported.

Certain embodiments operate in a networked environment, which can include a network 1010. The network 1010 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 1010 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1015. Each of the server computers 1015 may be configured with an operating system, including without limitation any of those discussed above, as well as any commercially (or freely) available server operating systems. Each of the servers 1015 may also be running one or more applications, which can be configured to provide services to one or more clients 1005 and/or other servers 1015.

Merely by way of example, one of the servers 1015 might be a data server, as described above. The data server might include (or be in communication with) a web server, which can be used, merely by way of example, to process requests for web pages or other electronic documents from user computers 1005. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1005 to perform methods of the invention.

The server computers 1015, in some embodiments, might include one or more application servers, which can be configured with one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™ IBM™ and the like, which can process requests from clients (including, depending on the configuration, dedicated database clients, API clients, web browsers, etc.) running on a user computer or user device 1005 and/or another server 1015. In some embodiments, an application server can perform one or more of the processes for certifying software applications with a green applications efficiency ("GAE") rating, one or more processes for implementing green software applications, or the like, as described in detail above. Data provided by an application server may be formatted as one or more web pages (comprising HTML, JavaScript, etc., for example) and/or may be forwarded to a user computer 1005 via a web server (as described above, for example). Similarly, a web server might receive web page requests and/or input data from a user computer 1005 and/or forward the web page requests and/or input data to an application server. In some cases a web server may be integrated with an application server.

In accordance with further embodiments, one or more servers 1015 can function as a file server and/or can include one or more of the files (e.g., application code, data files, etc.) necessary to implement various disclosed methods, incorporated by an application running on a user computer 1005 and/or another server 1015. Alternatively, as those skilled in the art will appreciate, a file server can include all necessary files, allowing such an application to be invoked remotely by a user computer or user device 1005 and/or server 1015.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020. The location of the database(s) 1020 is discretionary: merely by way of example, a database 1020a might reside on a storage medium local to (and/or resident in) a server 1015a (and/or a user computer or user device 1005). Alternatively, a database 1020b can be remote from any or all of the computers 1005, 1015, so long as it can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, the database 1020 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for certifying software applications with a green applications efficiency ("GAE") rating, the method comprising:
    calculating, with a computer, effective power consumption and effective computational work performed by one or more hardware components, in each load phase of a plurality of load phases, in response to execution of a software application, as measured by one or more measurement tools in communication with the computer, wherein the plurality of load phases comprises an initiation phase, a low load phase, an efficient load phase, a maximum load phase, an idle load phase, and a pre-stop/stop phase;
    calculating, with the computer, an efficiency rating for the software application, for each load phase, based on the calculated effective power consumption and the calculated effective computational work performed for the software application, for each load phase;
    categorizing, with the computer, the software application into one of four efficiency quadrants, based on computational output and power consumption of the software application, and based on the calculated efficiency rating for the software application, wherein the efficiency quadrants comprise a high output-low power quadrant, a high output-high power quadrant, a low output-low power quadrant, and a low output-high power quadrant;
    calculating, with the computer, an overall green applications efficiency ("GAE") rating for the software application, based on the categorizing of the software application into one of the four efficiency quadrants, and based on the calculated efficiency rating for the software application; and
    certifying, with the computer, the software application with the calculated GAE rating.

2. The method of claim 1, wherein the software application comprises one of a mobile software application, a tablet computer software application, a standalone desktop software application, an enterprise software application, or a software application deployed in a virtualized environment.

3. The method of claim 1, wherein the one or more measurement tools comprise at least one of a software-based measurement tool, a hardware-based measurement tool, or a combination hardware-software-based measurement tool.

4. The method of claim 1, wherein calculating the effective power consumption and the effective computational work performed by one or more hardware components, in each load phase, in response to execution of the software application comprises calculating a Justified Software Output and Software Energy Efficiency, wherein calculating the Justified Software Output and Software Energy Efficiency comprises factoring a drag coefficient associated with each hardware component affected during each load phase, calculating an impact cost factor for each drag coefficient, and calculating the Justified Software Output based on the factored drag coefficient associated with each hardware component affected during each load phase and the calculated impact cost factor for each drag coefficient.

5. The method of claim 1, wherein calculating the effective power consumption and the effective computational work performed by one or more hardware components, in each load phase, in response to execution of the software application comprises calculating a Computational Work Done and Software Energy Efficiency, wherein calculating the Computational Work Done and Software Energy Efficiency comprises calculating a computational force applied, a computational throughput, and computational memory utilization, and calculating the Computational Work Done based on the calculated computational force applied, computational throughput, and computational memory utilization over a predetermined period.

6. The method of claim 1, wherein calculating the effective power consumption and the effective computational work performed by one or more hardware components, in each load phase, in response to execution of the software application, comprises:
    calculating a total effective power consumption and a total effective computational work performed by the one or more hardware components, in each load phase, in response to execution of a plurality of software applications over a given period of time; and
    extrapolating an individual effective power consumption by the one or more hardware components, in each load phase, for each of the plurality of software applications, based at least in part on pre-calculated load profiles for each of the plurality of software applications.

7. An apparatus for certifying software applications with a green applications efficiency ("GAE") rating, the apparatus comprising:
    a processor; and
    a non-transitory computer readable medium having stored thereon software comprising a set of instructions that, when executed by the processor, causes the apparatus to perform one or more functions, the set of instructions comprising:
        instructions to calculate effective power consumption and effective computational work performed by one or more hardware components, in each load phase of a plurality of load phases, in response to execution of a software application, as measured by one or more measurement tools in communication with the apparatus, wherein the plurality of load phases comprises an initiation phase, a low load phase, an efficient load phase, a maximum load phase, an idle load phase, and a pre-stop/stop phase;
        instructions to calculate an efficiency rating for the software application, for each load phase, based on the calculated effective power consumption and the calculated effective computational work performed for the software application, for each load phase;
        instructions to categorize the software application into one of four efficiency quadrants, based on computational output and power consumption of the software application, and based on the calculated efficiency rating for the software application, wherein the efficiency quadrants comprise a high output-low power quadrant, a high output-high power quadrant, a low output-low power quadrant, and a low output-high power quadrant;

instructions to calculate an overall green applications efficiency ("GAE") rating for the software application, based on the categorizing of the software application into one of the four efficiency quadrants, and based on the calculated efficiency rating for the software application; and instructions to certify the software application with the calculated GAE rating.

8. The apparatus of claim 7, wherein the one or more measurement tools comprise at least one of a software-based measurement tool, a hardware-based measurement tool, or a combination hardware-software-based measurement tool.

9. The apparatus of claim 7, wherein the instructions to calculate the effective power consumption and the effective computational work performed by one or more hardware components, in each load phase, in response to execution of the software application comprises instructions to calculate a Justified Software Output and Software Energy Efficiency, wherein the instructions to calculate the Justified Software Output and Software Energy Efficiency comprises instructions to factor a drag coefficient associated with each hardware component affected during each load phase, instructions to calculate an impact cost factor for each drag coefficient, and instructions to calculate the Justified Software Output based on the factored drag coefficient associated with each hardware component affected during each load phase and the calculated impact cost factor for each drag coefficient.

10. The apparatus of claim 7, wherein the instructions to calculate the effective power consumption and the effective computational work performed by one or more hardware components, in each load phase, in response to execution of the software application comprises instructions to calculate a Computational Work Done and Software Energy Efficiency, wherein the instructions to calculate the Computational Work Done and Software Energy Efficiency comprises instructions to calculate a computational force applied, a computational throughput, and computational memory utilization, and instructions to calculate the Computational Work Done based on the calculated computational force applied, computational throughput, and computational memory utilization over a predetermined period.

* * * * *